Figure 1:
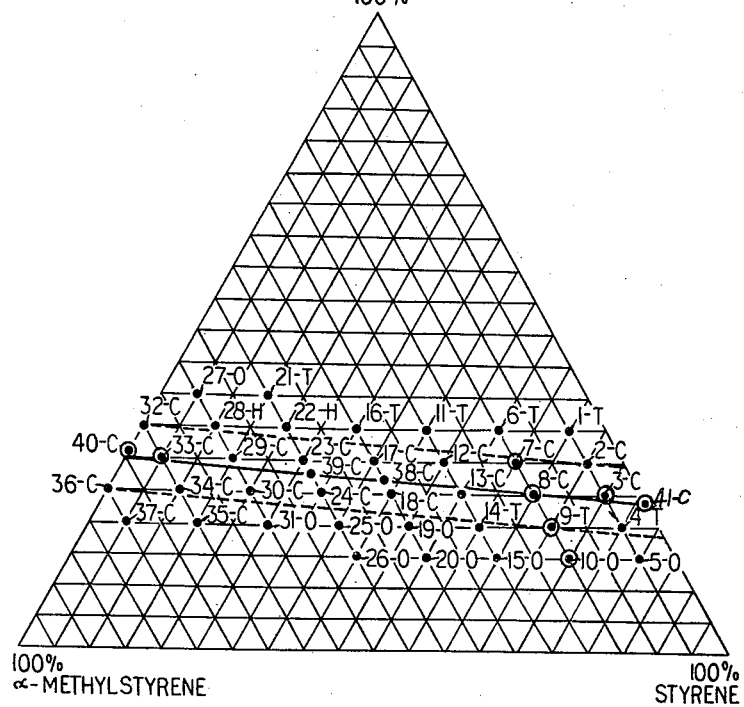
Figure 2:
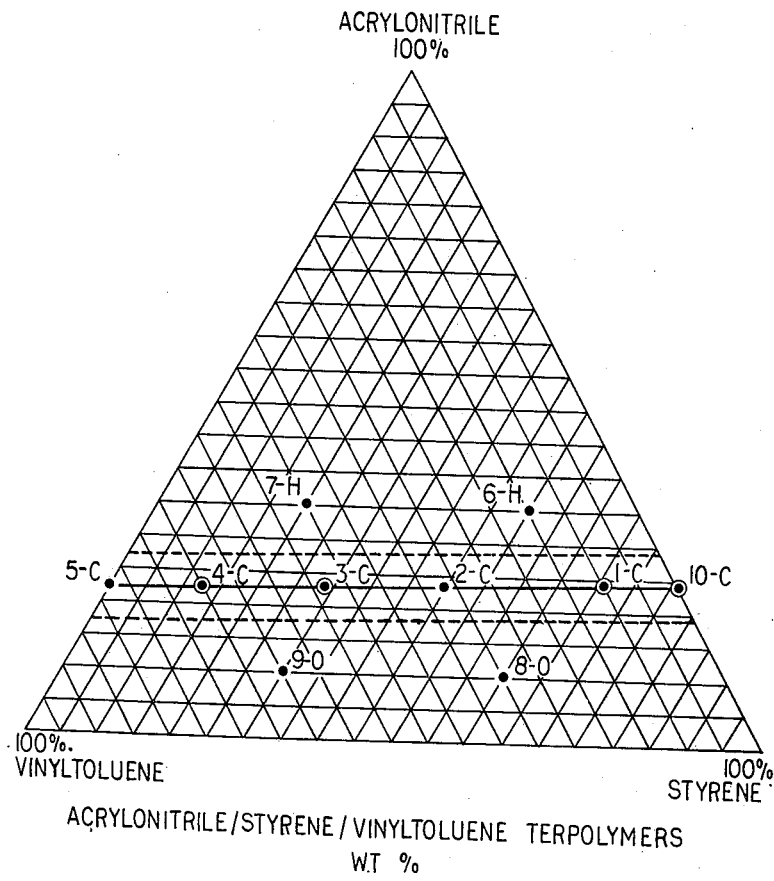
Figure 3:
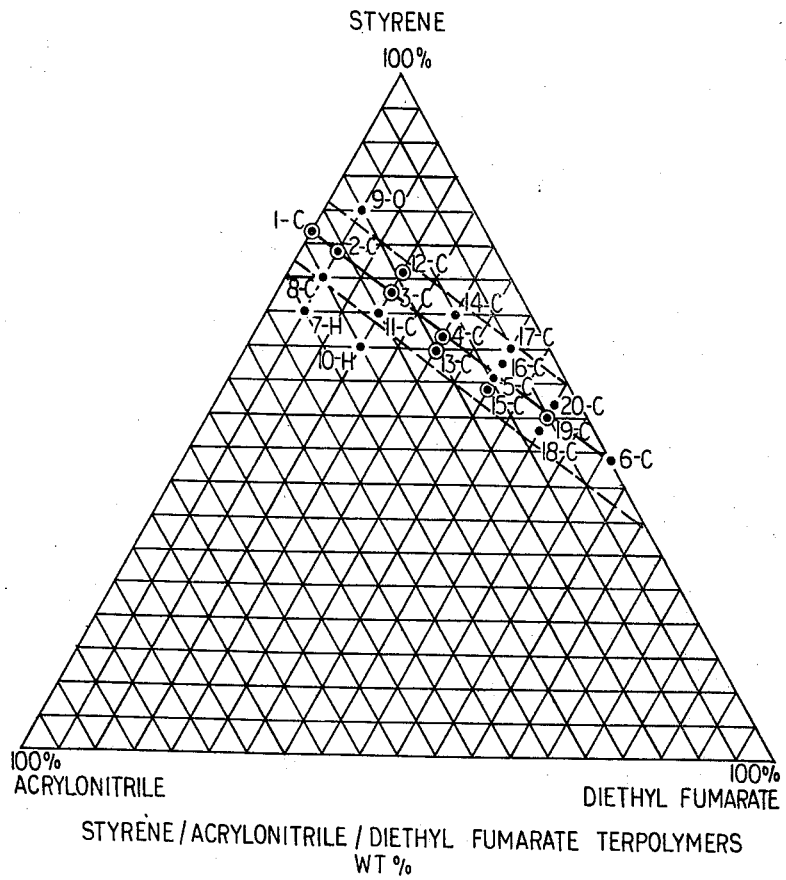
Figure 4:
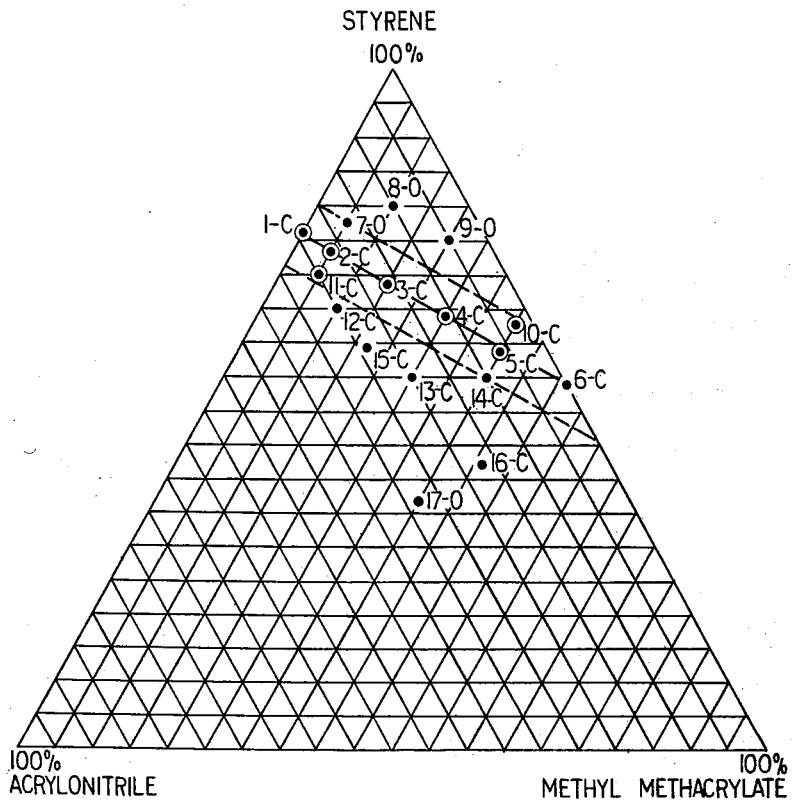
Figure 5:
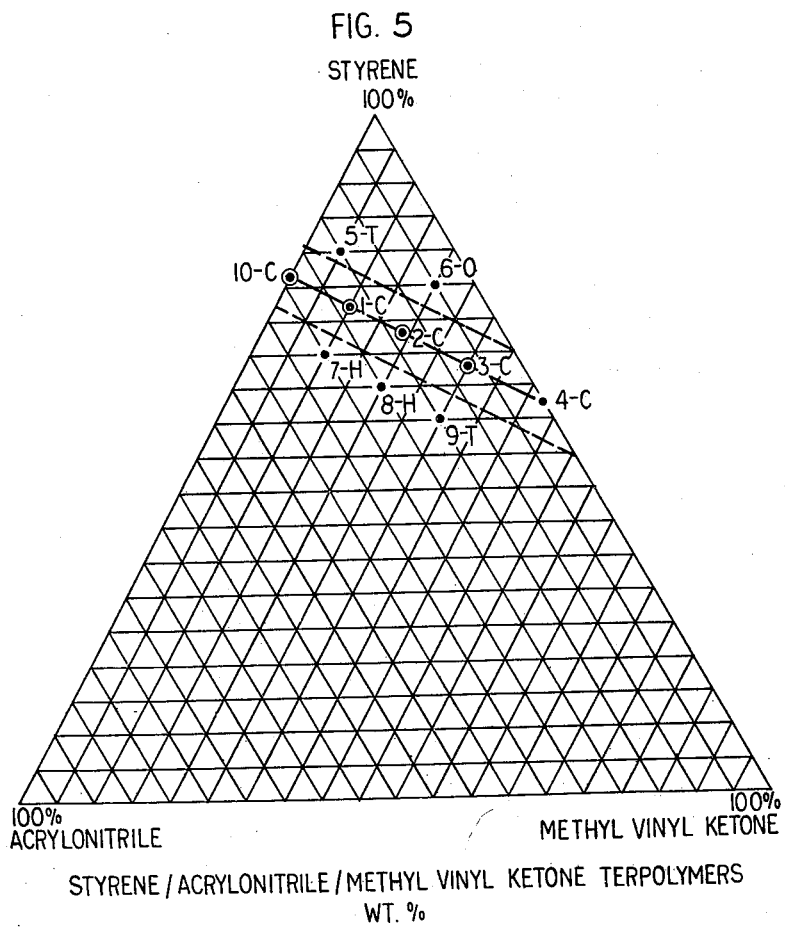
Figure 6:
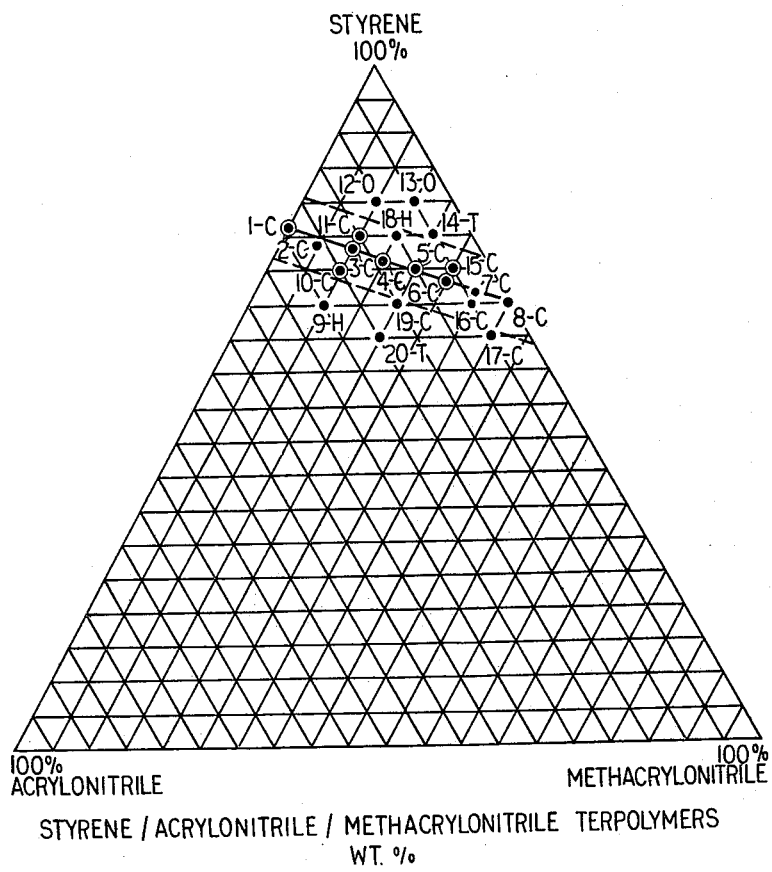
Figure 7:
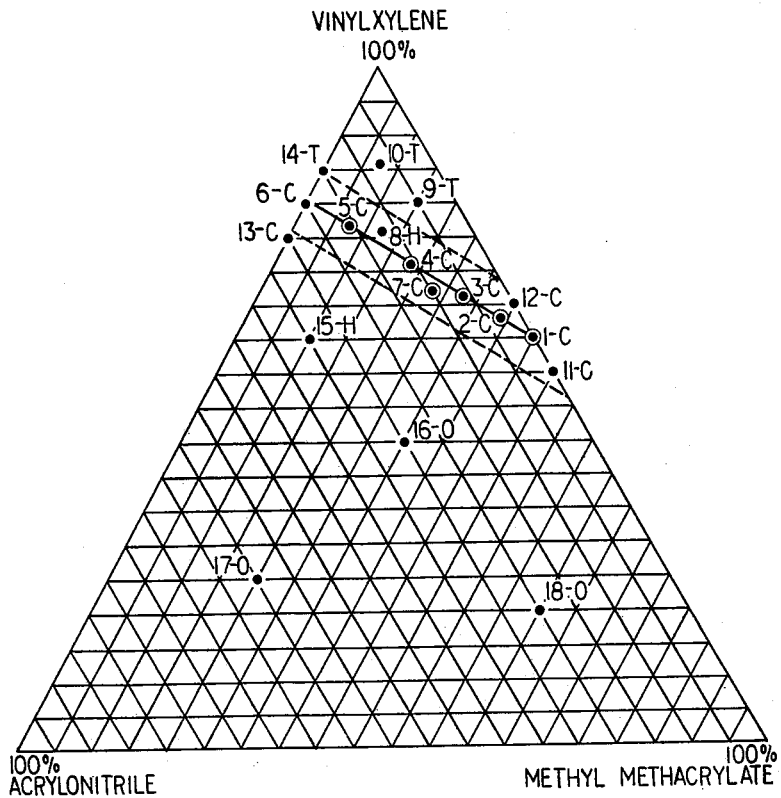
Figure 8:
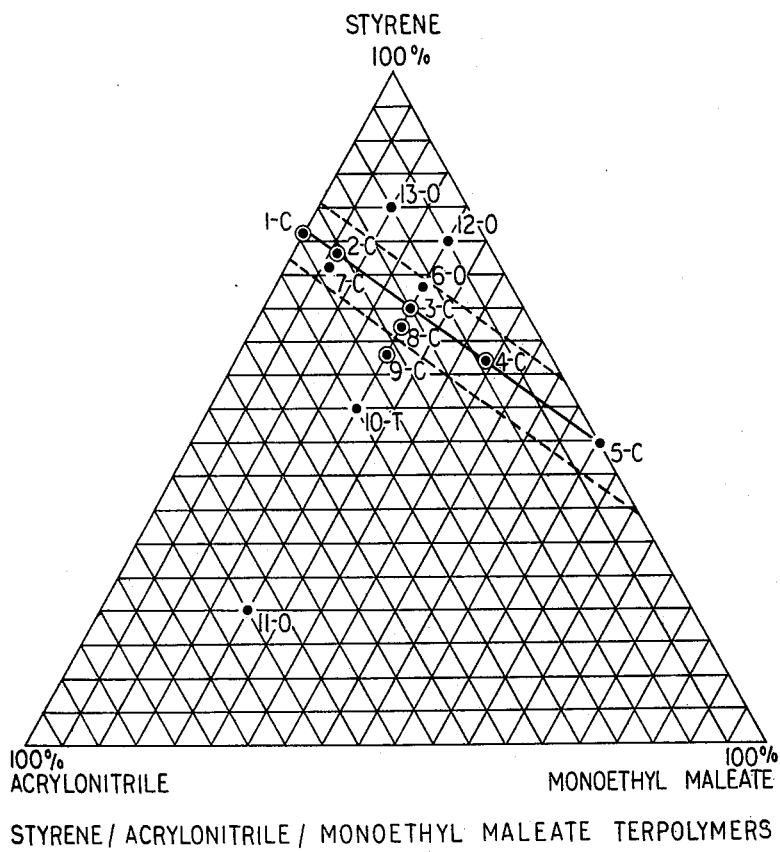
Figure 9:
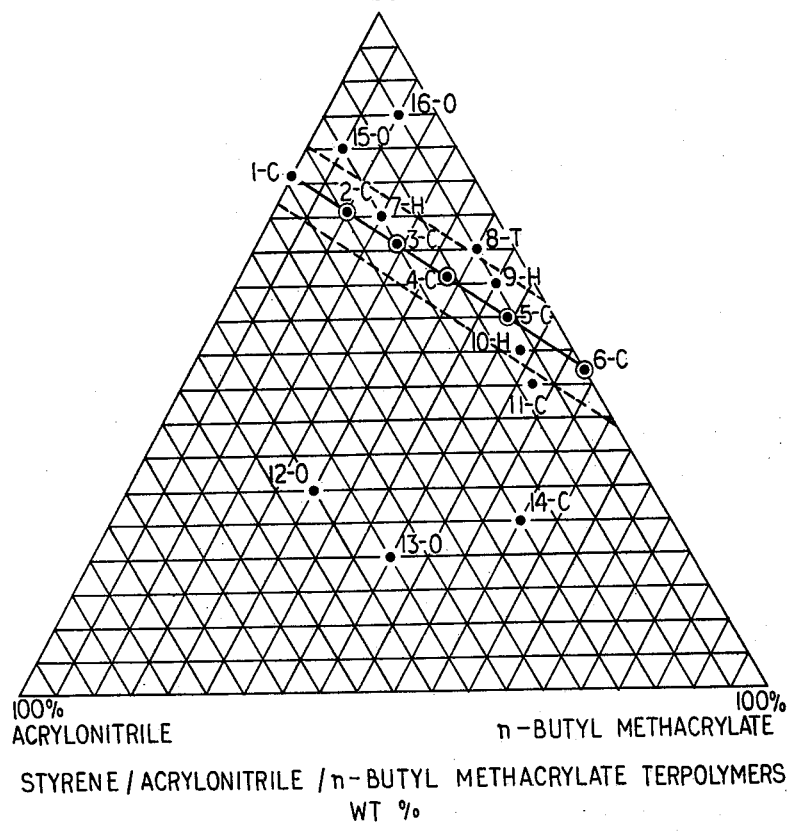
Figure 10:
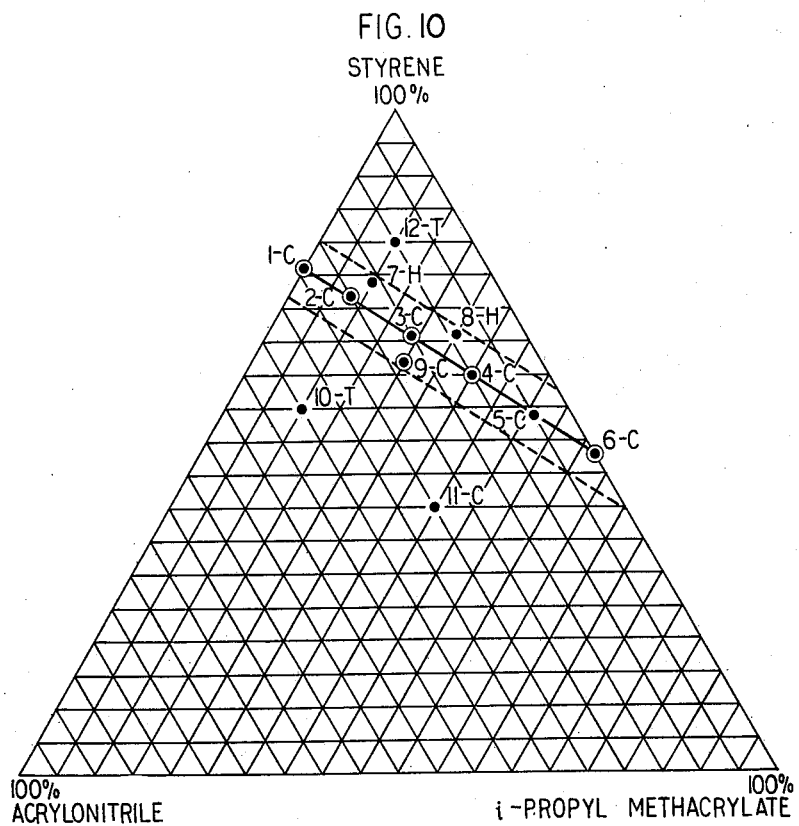
Figure 11:
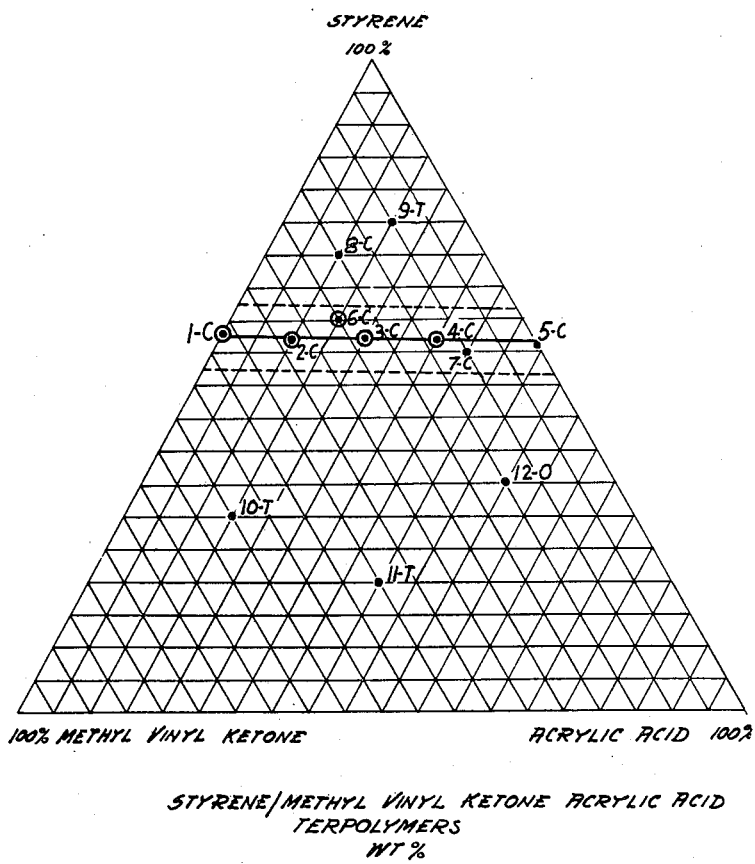
Figure 12:
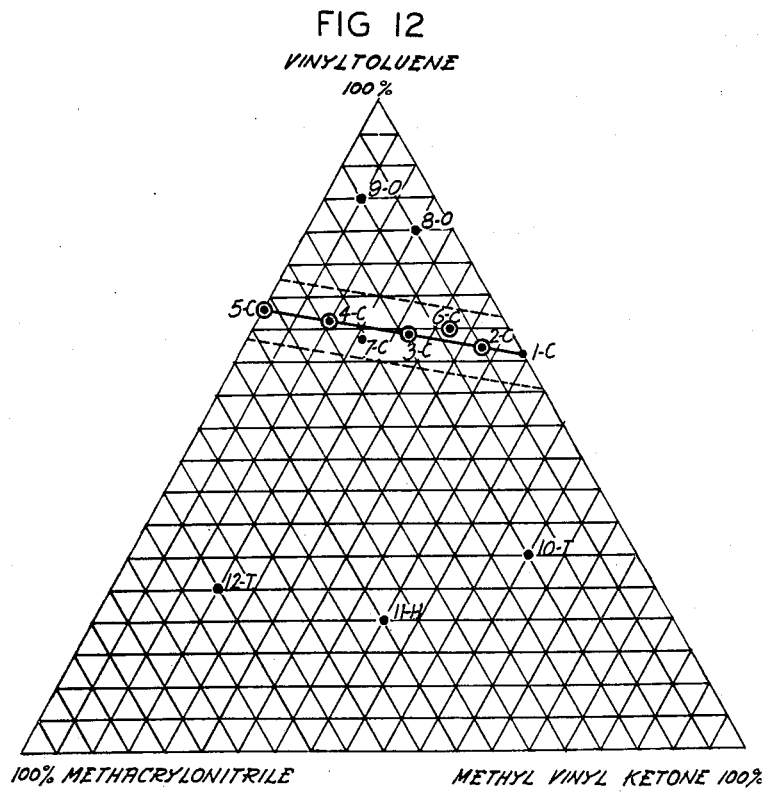
Figure 13:
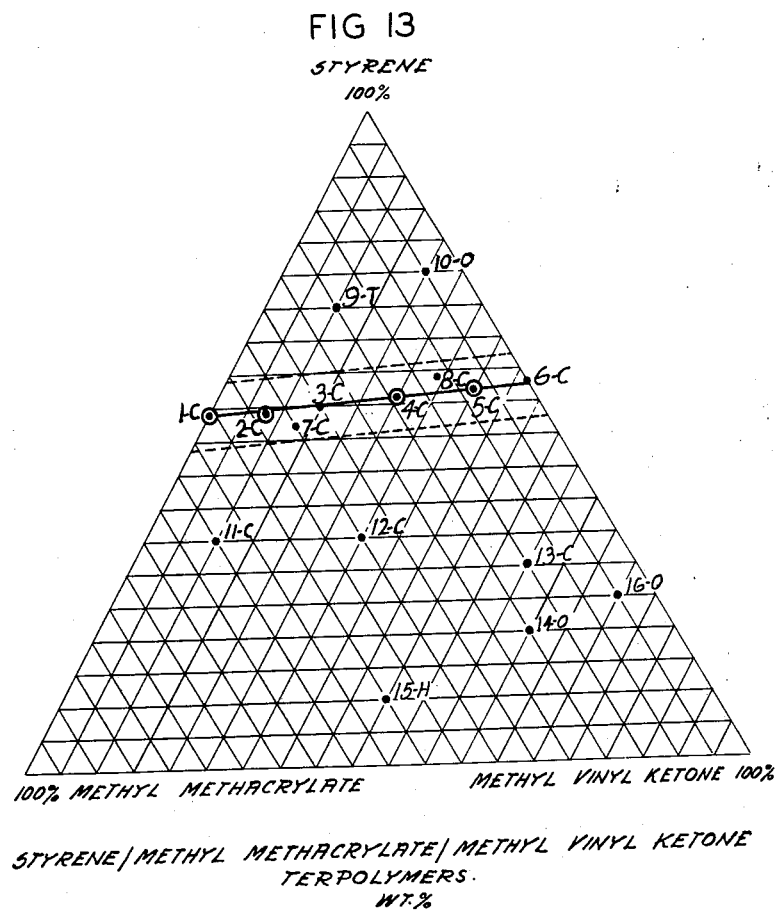
Figure 14:
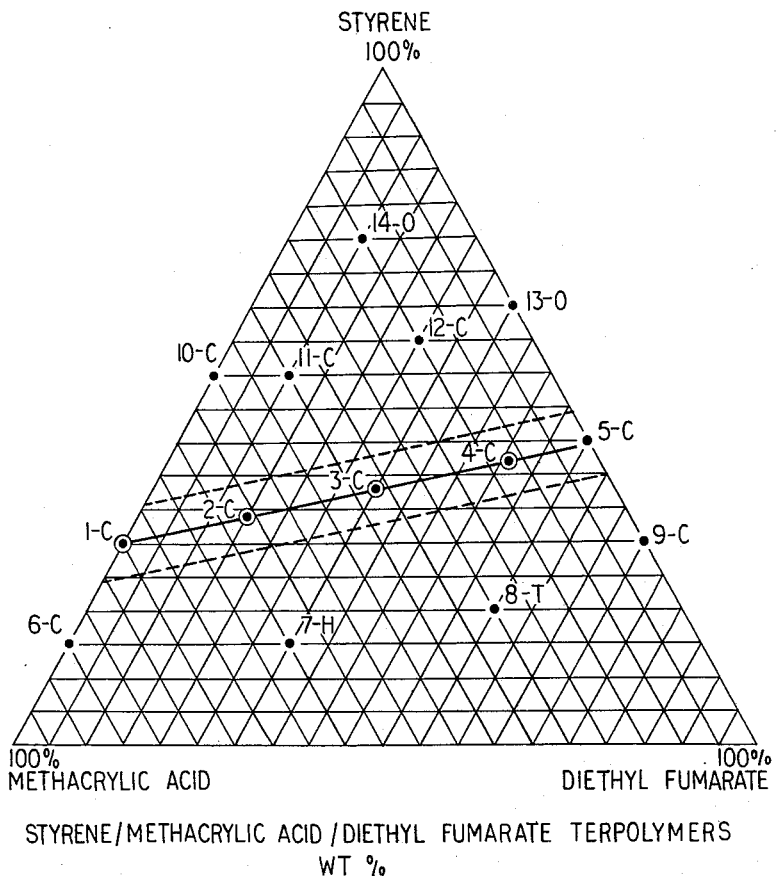
Figure 15:
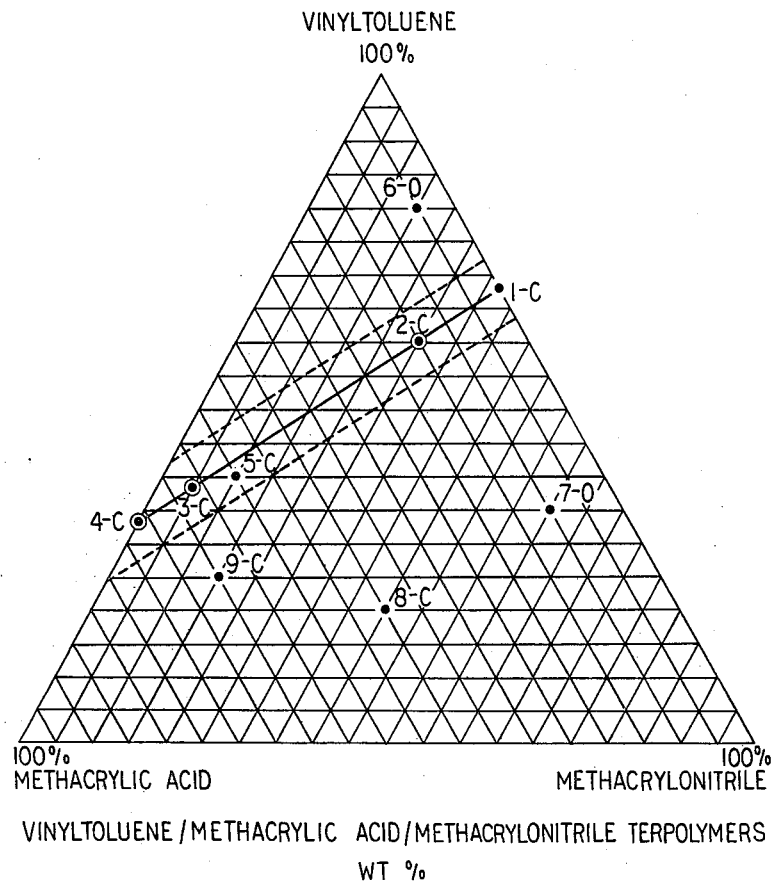
Figure 16:
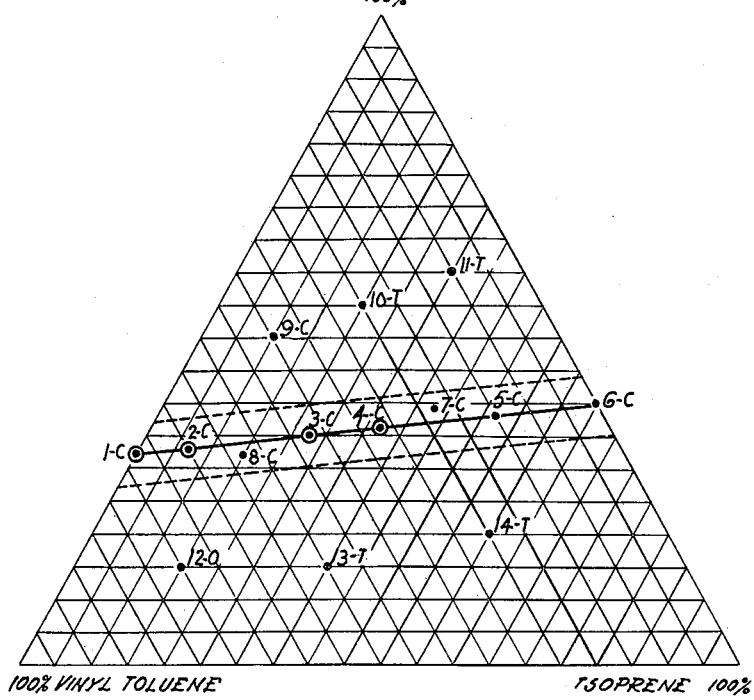
Figure 17:
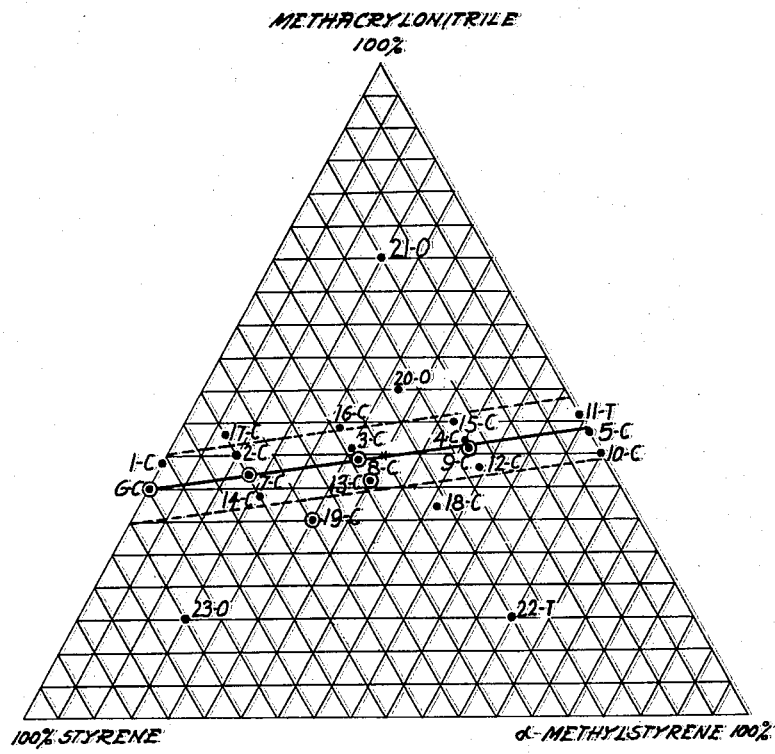
Figure 18:
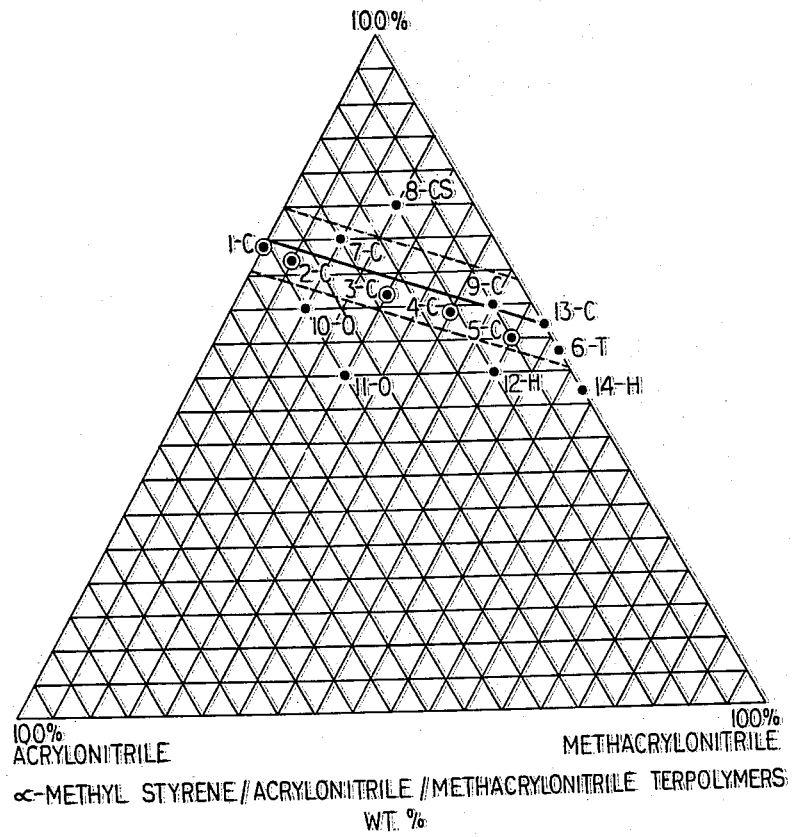
Figure 19:
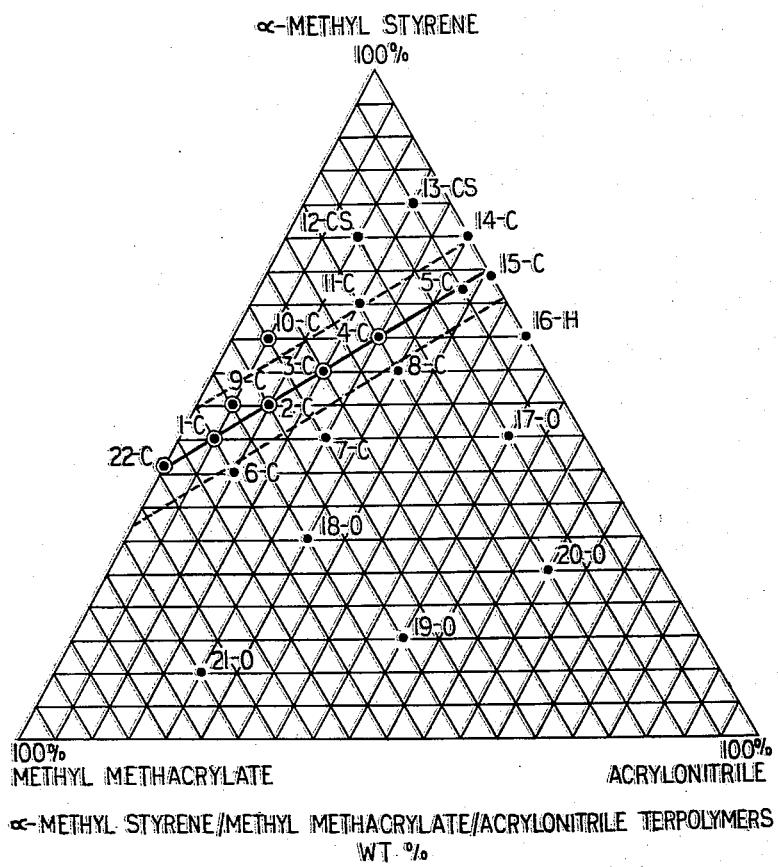

Nov. 21, 1961   R. J. SLOCOMBE   3,009,895
COMPATIBLE BLENDS OF TWO OR MORE INTERPOLYMERS THAT FOLLOW
THE SLOCOMBE-WESP RULE OF AZEOTROPIC LINE CLARITY AND
SOLUTIONS THEREOF
Filed Dec. 31, 1956   22 Sheets-Sheet 1

FIG. I.

ACRYLONITRILE / STYRENE / α-METHYLSTYRENE TERPOLYMERS
WT. %

INVENTOR
ROBERT J. SLOCOMBE
BY
ATTORNEY

STYRENE/ACRYLONITRILE/DIETHYL FUMARATE TERPOLYMERS
WT %

STYRENE/ACRYLONITRILE/METHYL METHACRYLATE TERPOLYMERS
WT %

STYRENE / ACRYLONITRILE / METHYL VINYL KETONE TERPOLYMERS
WT. %

*INVENTOR*
ROBERT J. SLOCOMBE
*ATTORNEY*

STYRENE/ACRYLONITRILE/MONOETHYL MALEATE TERPOLYMERS
WT %

STYRENE/ACRYLONITRILE/n-BUTYL METHACRYLATE TERPOLYMERS
WT %

STYRENE / ACRYLONITRILE / i-PROPYL METHACRYLATE TERPOLYMERS
WT %

Nov. 21, 1961 R. J. SLOCOMBE 3,009,895
COMPATIBLE BLENDS OF TWO OR MORE INTERPOLYMERS THAT FOLLOW
THE SLOCOMBE-WESP RULE OF AZEOTROPIC LINE CLARITY AND
SOLUTIONS THEREOF
Filed Dec. 31, 1956 22 Sheets-Sheet 11

INVENTOR
ROBERT J. SLOCOMBE
BY
ATTORNEY

VINYLTOLUENE/METHACRYLIC ACID/METHACRYLONITRILE TERPOLYMERS
WT %

Nov. 21, 1961   R. J. SLOCOMBE   3,009,895
COMPATIBLE BLENDS OF TWO OR MORE INTERPOLYMERS THAT FOLLOW
THE SLOCOMBE-WESP RULE OF AZEOTROPIC LINE CLARITY AND
SOLUTIONS THEREOF

Filed Dec. 31, 1956   22 Sheets-Sheet 16

METHACRYLONITRILE/VINYLTOLUENE/ISOPRENE TERPOLYMERS
WT.%

INVENTOR
ROBERT J. SLOCOMBE
BY
John D. Upham
ATTORNEY

α-METHYL STYRENE/METHYL METHACRYLATE/ACRYLONITRILE TERPOLYMERS
WT %

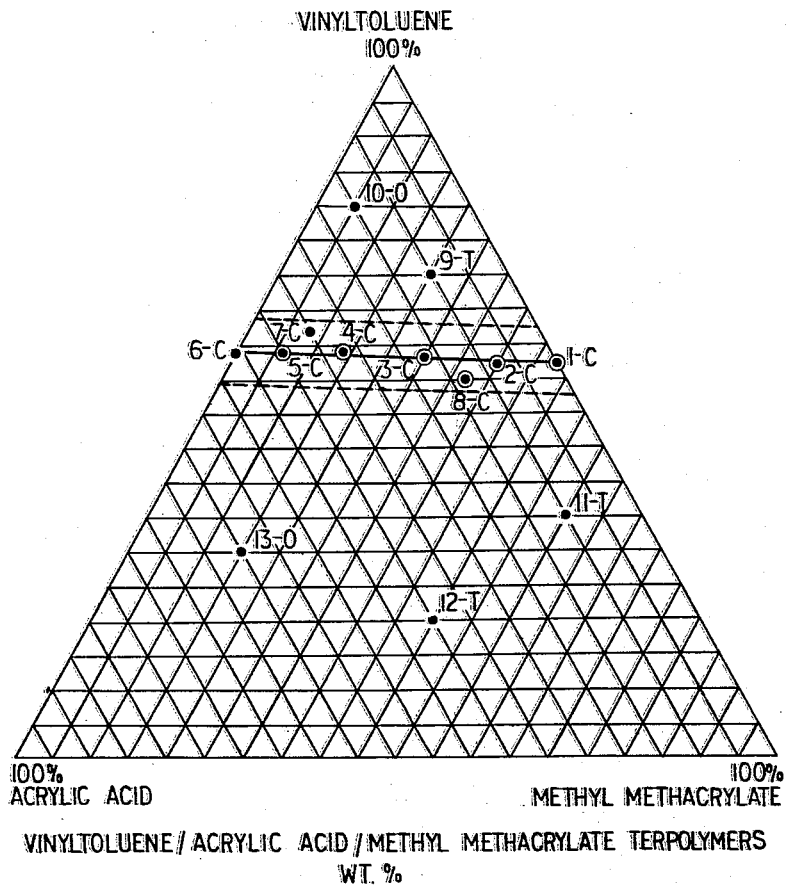

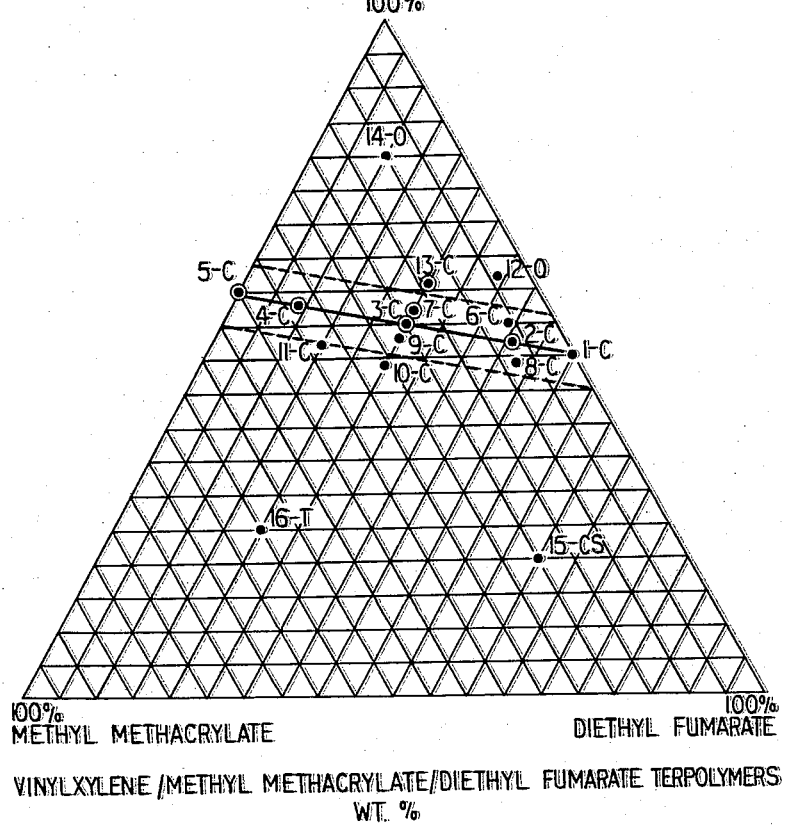

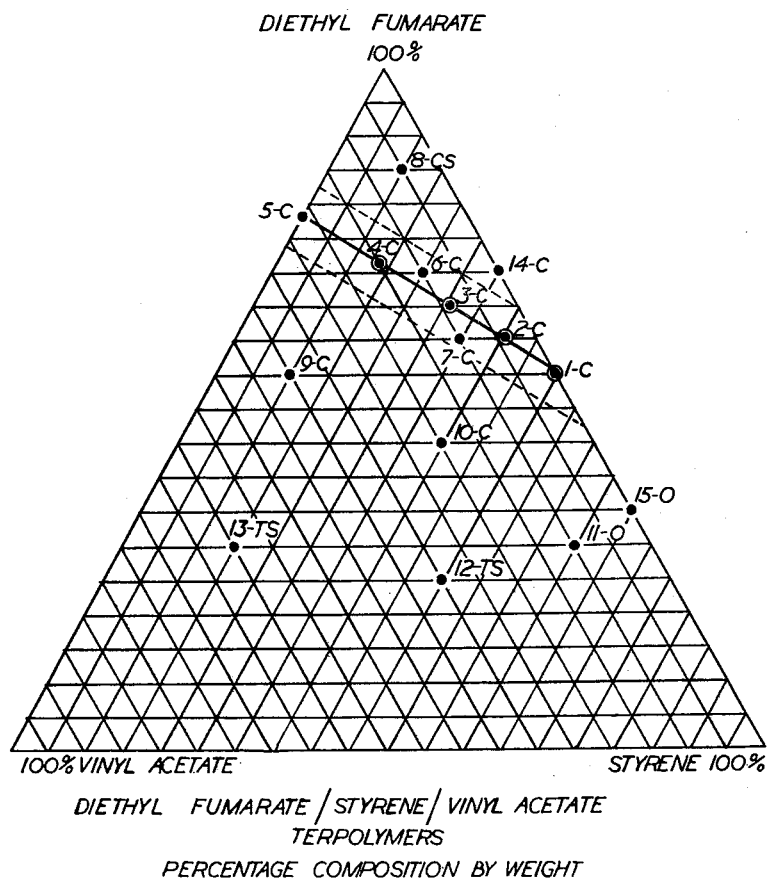

3,009,895
COMPATIBLE BLENDS OF TWO OR MORE INTER-
POLYMERS THAT FOLLOW THE SLOCOMBE-
WESP RULE OF AZEOTROPIC LINE CLARITY
AND SOLUTIONS THEREOF
Robert J. Slocombe, Dayton, Ohio, assignor to Monsanto
Chemical Company, St. Louis, Mo., a corporation of
Delaware
Filed Dec. 31, 1956, Ser. No. 631,911
10 Claims. (Cl. 260—32.8)

The present invention relates to polymer blends. In some of its aspects the invention relates to compatible blends of two or more different terpolymers. In other aspects the invention relates to compatible blends of one or more terpolymers with one or more particular copolymers (the term "copolymer" as used herein refers to a binary interpolymer, i.e., a polymer obtained by the interpolymerization of two different monomers that are copolymerizable with each other). In specific aspects the invention relates to clear solutions and films of these polymer blends. In other aspects the invention relates to homogeneous plasticized polymer blends.

It is generally known that when two different high polymers are blended, incompatibility is the rule rather than the exception. Incompatibility manifests itself by inhomogeneity of the blend, and this is reflected in poor physical properties, opaque films (even though the polymer components of the blend may each be clear), and separation of phases in the presence of a solvent.

An interesting statement of the problem is given by Dobry and Boyer-Kawenoki, Journal of Polymer Science 2, 90 (1947), from which the following excerpts are taken. "The incompatibility of certain high polymers towards each other has been observed for a long time, especially in the field of varnishes and paints. Experiments to improve such products by blending different constituents have often been frustrated by their incompatibility. This incompatibility can be easily recognized by the fact that films obtained from mixtures are not homogeneous but turbid or opaque and possess mechanical properties which are inferior to those of films obtained from the separate constitutents. Technical reviews often contain information concerning compatibility but only from the special point of view of technical interest. This information is spread over a great number of publications. . . . No effort has apparently been made so far to make a methodical study of compatibility." The authors further state: "In the absence of a chemical reaction, two solutions of small molecules are always miscible, provided they are far enough from saturation. In other words, an unsaturated solution of a material of low molecular weight can always dissolve a quantity of some other substance which is comparable with the amount which can be dissolved in the pure solvent. Our experiments show that this is not at all true for macromolecules and that a polymer solution which is still far from its saturation point is, in general, almost totally impenetrable to another high polymer. This phenomenon causes incompatibility; it reveals a characteristic property of macromolecules." The authors proceeded to present experimental evidence on a variety of high polymers and solvents, thereby establishing the generality of the behavior that when polymers of two different species are dissolved in a common solvent the resulting solution usually separates into two phases. Films formed from such polymer blends were turbid or opaque. Further, the phenomenon was noted with more than two polymer species; thus, three polymers in a solvent separated into three separate liquid phases. This phenomenon of phase separation when polymers of different species are dissolved in a common solvent has since come to be known as the Dobry effect. The authors concluded that: "There is no obvious relationship between the compatibility of two polymers and the chemical nature of their monomers. The similarity of the principal chains is not sufficient to insure the miscibility of two polymers. . . . The similarity of substituents is also insufficient. . . . In the few exceptional cases of high miscibility, one cannot see any structural analogy." The investigation has been extended by various other workers. Thus R. J. Kern and R. J. Slocombe in Journal of Polymer Science 15, 183 (1955), state: "The generality of phase separation is testified by over twenty systems . . . which are in addition to those reported by Dobry. It is apparent that phase separation occurs even though the monomer units of the polymer pairs are very similar chemically. . . . Only three pairs were miscible in all solvents and concentrations tried. . . . This phenomenon is not limited to two phases. Polyvinyl acetate, polystyrene, poly-2-methyl-5-vinylpyridine and polymethyl vinyl ketone in dioxane form a four-phase system." To the present time, no criteria have been presented to the art by which it can be predetermined whether or not two high polymers will or will not be compatible, and the presumption is always that they will not be.

I have now discovered certain rules by which compatible mixtures of certain interpolymers can be prepared. The invention in particular is applicable to mixtures of two different terpolymers, each of which however has been prepared from the same three monomers. As shown hereinafter, however, it may not be supposed that so long as two terpolymers are available, each of which has been prepared from the same three monomers although in different proportions, blends of same will be compatible. In fact, it is only when the monomer proportions in each of the two terpolymers have been carefully selected in accordance with rules to be described hereinafter, that the two terpolymers can be blended to produce compatible blends. The invention is also applicable in certain special cases wherein one of the interpolymers blended is a terpolymer and another is a (binary) copolymer, as will be set forth in further detail hereinafter.

There are certain pairs of ethylenically unsaturated monomers which, in a proportion characteristic of that pair, gives a copolymer having the same composition as the particular monomeric mixture. In such instances, a batch polymerization can be carried out with a monomeric mixture of the particular composition with a resultant homogeneous copolymer containing the same relative proportions of the monomers as in the initial monomeric reaction mixture. This composition is known as the binary polymerization azeotrope composition. A large proportion of possible pairs of ethylenically unsaturated monomers are incapable of forming under any conditions an instantaneous polymer having the same composition as the monomeric mixture from which it is formed, and the two monomers in such a pair thus do not form a binary azeotropic copolymer with each other.

The present invention is concerned with terpolymer systems wherein the ethylenically unsaturated monomers (a), (b) and (c) are such that monomer (a) forms a binary azeotropic copolymer with monomer (b) and also forms a binary azeotropic copolymer with monomer (c), yet monomers (b) and (c) do not form a binary azeotropic copolymer with each other. It has been found, as disclosed in certain copending applications of George L. Wesp and myself, hereinafter identified, that certain of such terpolymer systems are unique in that if a triangular coordinate graph is made wherein each apex designates 100 percent of one of the three monomers, and a line (herein called the "azeotropic line") is drawn joining the binary polymerization azeotrope composition of (a) and (b) on the one hand and the binary azeotrope composition of (a) and (c) on the other hand, terpolymers prepared from monomeric mixtures whose compositions lie on and near such line are clear and homogeneous, whereas if the monomer compositions are removed somewhat from the line the terpolymers are non-homogeneous and range from hazy to turbid to opaque, generally in that order as the monomer composition increases in distance from the line. Thus, there is an area of clear terpolymers lying along the line, a larger area of non-turbid, i.e., hazy or clear, terpolymers lying along the line, and a still larger area of non-opaque, i.e., turbid, hazy or clear, terpolymers lying along the line. Terpolymer systems of the characteristics just described are said to be "regular" in following what is termed the Slocombe-Wesp rule of azeotropic line clarity.

The present invention is based on the remarkable discovery that if two terpolymers of a given three monomers (a), (b) and (c) which satisfy the foregoing requirements, are prepared by free-radical-initiated batch polymerization of two monomeric mixtures each of which has a composition within the area of non-opaque terpolymers lying along the said "azeotropic line," a blend of such terpolymers is homogeneous. The invention extends to the special case where one of the polymers is not a terpolymer but rather is an (a)/(b) or (a)/(c) copolymer provided it is the binary azeotropic copolymer. I have very surprisingly found that two, three or more terpolymers can be prepared from given monomers (a), (b) and (c), the monomeric mixtures from which the terpolymers are prepared differing greatly from each other in the relative proportions of the monomers therein, and yet so long as the compositions lie on or near the line joining the two binary azeotrope compositions (i.e. the "azeotropic line") the blend of the terpolymers will be homogeneous. On the other hand, two or more terpolymers can be prepared from the same monomers and from monomer compositions lying much closer together, yet if those compositions are not on or near the "azeotropic line," the polymer blends are not compatible.

The invention will be more readily understood by describing it in terms of a particular group of three monomers and with respect to various possible terpolymers obtainable therefrom, and accordingly in its greatest detail the invention will be described with reference to terpolymers of acrylonitrile, styrene and α-methylstyrene (as well as copolymers of acrylonitrile and styrene and of acrylonitrile and α-methylstyrene), which is to be taken as representative of all of the terpolymer systems with which the invention is concerned. Before proceeding to a detailed consideration of this representative system, however, it is believed that a more thorough understanding of the invention will be obtained by considering the question of interpolymerization in general and the reactivity of monomers towards each other.

It is by now well known that ethylenically unsaturated monomers differ greatly in their polymerization reactivity toward each other. There are in fact some monomers that will not undergo homopolymerization at all, i.e., polymerization of two or more molecules of the same monomer to form a polymer of that monomer, yet will readily undergo interpolymerization with certain other monomers. Interpolymerization affords a method of imparting varying characteristics to a polymer, and in many instances such characteristics cannot be obtained by mere physical admixture of two or more homopolymers. However, because of the above-mentioned differences in reactivity among monomers toward each other, marked heterogeneity is the rule in interpolymers and only under special circumstances can an interpolymer be obtained that is of sufficient homogeneity to give a transparent or clear interpolymer. While some objectionable properties such as color, encountered in interpolymers, can often be avoided by means such as the use of stabilizers or lower polymerization temperatures, incompatibility manifested by haze, turbidity, or opacity in plastics is not overcome by such treatment.

If a monomeric mixture is subjected to polymerization and the initial increment of polymer is segregated before the polymerization is allowed to go forward to an appreciable extent, it is frequently possible to obtain a clear interpolymer, but the commercial impracticability of such a procedure is apparent. On the other hand, if polymerization is permitted to proceed to a considerable and especially to a high degree of conversion, the more reactive monomer enters into the polymer to a greater extent than a less reactive monomer or monomers with the consequence that residual unreacted monomer becomes more and more depleted in the more reactive monomer, while the polymer being formed in the latter stages of polymerization is deficient in the more reactive monomer. There results a polymeric material which is made up of a variety of polymer molecules running a gamut of compositions such that the total polymer is heterogeneous with resultant opacity and often greatly impaired physical properties. This phenomenon, resulting in an undesirable product, can be overcome to an appreciable but limited extent by gradually adding during the course of the polymerization the more reactive monomer at a rate aimed at keeping the composition of unreacted monomeric mixture essentially constant. As a practical matter it is extremely difficult to approach uniformity in such an operation, and it is impossible to use this technique at all in the case of mass (bulk) polymerization in which the polymerization reaction mixture sets up into semi-solid or solid polymer after the reaction is only partly completed so that further access of added monomer to the total mixture cannot be obtained.

It is only in recent years that systematic laboratory and theoretical studies of interpolymerization have gone forward sufficiently to permit a certain amount of predictability in this field. It has been theorized that in a simple binary system involving the free-radical-initiated polymerization of only two monomers, the composition of polymer will be dependent only upon the rate of four propagation steps, i.e., steps in the propagation of polymer molecules. Thus, taking a system involving two monomers, $M_1$ and $M_2$, a growing polymer chain can have only two kinds of active terminal groups, i.e., a group derived from $M_1$ or a group derived from $M_2$. Either of these groups has the possibility of reacting with either $M_1$ or with $M_2$. Using $m_1$ and $m_2$ to indicate these active terminal groups, the four possible reactions are as follows:

| Growing chain | Adding monomer | Rate of process | Reaction product |
|---|---|---|---|
| $\sim\sim m_1 \cdot$ | $M_1$ | $k_{11}[m_1\cdot][M_1]$ | $\sim\sim m_1 m_1 \cdot$ |
| $\sim\sim m_1 \cdot$ | $M_2$ | $k_{12}[m_1\cdot][M_2]$ | $\sim\sim m_1 m_2 \cdot$ |
| $\sim\sim m_2 \cdot$ | $M_2$ | $k_{22}[m_2\cdot][M_2]$ | $\sim\sim m_2 m_2 \cdot$ |
| $\sim\sim m_2 \cdot$ | $M_1$ | $k_{21}[m_2\cdot][M_1]$ | $\sim\sim m_2 m_1 \cdot$ |

Theoretical considerations lead to the now generally accepted copolymer composition equation which describes the ratio $$\frac{[M_1]}{[M_2]}$$

of the molar concentrations of two monomers in the initial copolymer formed from a given mixture of the monomers as follows:

$$\frac{d[M_1]}{d[M_2]} = \frac{[M_1]}{[M_2]} \cdot \frac{r_1[M_1]+[M_2]}{r_2[M_2]+[M_1]}$$

In this equation $r_1$ equals $k_{11}/k_{12}$ and $r_2$ equals $k_{22}/k_{21}$. The terms $r_1$ and $r_2$ are called "reactivity ratios." A very considerable body of experimental work has in general confirmed the copolymer composition equation.

A large proportion of possible pairs of monomers are incapable, because of their respective reactivity ratios, of forming under any conditions an instantaneous polymer having the same composition as the monomeric mixture from which it is formed. However there are certain monomer pairs which, in a proportion characteristic of that pair, give a copolymer having the same composition as the particular monomeric mixture. In such instances, a batch polymerization can be carried out with a monomeric mixture of the particular composition with a resultant homogeneous copolymer containing the same relative proportions of the monomers as in the initial monomeric reaction mixture. This composition is known as the polymerization azeotrope composition, and is represented by the equation:

$$\frac{[M_2]}{[M_1]} \frac{r_1-1}{r_2-1}$$

Such an azeotrope composition exists for those monomer pairs wherein both $r_1$ and $r_2$ are less than one, or theoretically wherein both $r_1$ and $r_2$ are greater than one although no examples of the latter combination are known.

While an understanding of interpolymerization involving only two monomers is now possible to a considerable extent, because of the development of the above-discussed theories, an increase in the number of monomers to three or more obviously tremendously increases the possibilities and complications. Thus, for example if interpolymers of 100 monomers are to be considered, there are about 5000 possible monomer pairs, but about 160,000 different combinations of three monomers are possible, and for each of these 160,000 combinations the variations in relative proportions of the three monomers are infinite. If the assumptions made in the development of the copolymer composition equation still hold true where three monomers are to be interpolymerized, it is apparent that the composition of the terpolymers formed at any given instance will now be dependent upon the rate of nine propagation steps which are dependent upon the relative concentrations of the monomers in the monomeric mixture and the reactivity ratio between each of the pairs of the monomers in the mixture. It has been pointed out that the study of terpolymers can be simplified somewhat by application of the copolymer composition equation, suitably modified for three-component systems, so as to eliminate from consideration monomers whose ability to interpolymerize is so slight that further investigation of such combinations is obviously not warranted. However, the discovery of terpolymers having particularly desired physical properties has to the present time been limited to the "needle in the haystack" type of investigation. There is an obvious need for some procedure in the terpolymer field whereby terpolymers of particular properties can be made with a reasonable degree of predictability.

In accordance with the copending applications of Robert J. Slocombe and George L. Wesp, bearing Serial Numbers 396.481–7 inclusive and 396,506, all filed December 7, 1953, now respectively issued as U.S. Patents 2,851,446; 2,829,125; 2,851,444; 2,854,439; 2,851,447; 2,851,448; 2,836,580 and 2,829,128, to which reference is hereby made, there have been found certain groups of terpolymers that can be made by free-radical-initiated batch polymerization and that have the very desirable property of clarity. The terpolymers in question are made by batch polymerizing a monomeric mixture of certain proportions of three monomers. The proportions giving clear terpolymers will vary from one monomeric mixture to another depending upon the particular monomers present in that mixture. By way of example, the terpolymer systems described in Serial No. 396,481 will be discussed, and the same principles are applicable to the systems set forth in the other identified applications. In said Serial No. 396,481 the invention is particularly applied to monomeric mixtures consisting essentially of (a) acrylonitrile, (b) a monomer selected from the group consisting of α-acetoxystyrene, α-methylstyrene, styrene, vinyltoluene, vinylxylene, and (c) a different monomer selected from the same group listed under (b). For example, a monomeric mixture consisting of acrylonitrile, α-methylstyrene, and styrene will, when subjected to free-radical-initiated batch polymerization, give a clear terpolymer only if the relative proportions of acrylonitrile, α-methylstyrene and styrene are properly chosen in a manner to be hereinafter described. In contrast, a monomeric mixture consisting of acrylonitrile, styrene, and vinyltoluene will give a clear terpolymer on being subjected to free-radical-initiated batch polymerization only if the relative proportions of the three mentioned monomers in the monomeric mixture are within certain limits which in general are different from those of the aforementioned mixtures of acrylonitrile, α-methylstyrene and styrene, and yet which are chosen in accordance with the same principle now to be discussed.

It has been found that clear terpolymers of the nature described are made provided the proportions of three monomers in the monomeric mixture are chosen from the area lying along the line joining the binary polymerization azeotrope composition of acrylonitrile and the particular (b) on the one hand, and the binary polymerization azeotrope composition of acrylonitrile and the particular (c) on the other hand, as plotted on a triangular coordinate graph. By way of example, taking the case where (b) is α-methylstyrene and (c) is styrene, the point of the binary azeotrope composition of acrylonitrile and α-methylstyrene is placed along one side of a triangular coordinate graph at the proper location between the apex designating 100 percent acrylonitrile and the apex designating 100 percent α-methylstyrene. This point is 30 weight percent acrylonitrile and 70 weight percent α-methylstyrene. On the opposite side of the equilateral triangle, constituting the triangular coordinate graph, is placed the point representing the binary azeotrope composition of acrylonitrile and styrene, this of course being located at the proper position on the side of the triangle between the apex representing 100 percent acrylonitrile and the apex representing 100 percent styrene. This point is approximately 24 weight percent acrylonitrile and 76 weight percent styrene. Now a straight line is drawn between these two points; this line has been designated the "azeotropic line." This line cuts across the triangular coordinate graph without touching the side of the triangle opposite the acrylonitrile apex which side represents varying proportions of α-methylstyrene and styrene in binary mixtures of same. α-Methylstyrene and styrene do not form a binary azeotrope. The said straight line joining the two points of binary azeotrope compositions describes three-component monomeric mixtures which, when subjected to free-radical-initiated batch polymerization, give clear terpolymers. Further, there is an appreciable area lying on each side of said line in which the terpolymers are essentially clear. However, one cannot go too far from this line without producing terpolymers which are not clear but range from hazy to opaque materials. The invention particularly applies to the area lying within 5 percent on each side of said line; said 5 percent is measured on the graph in a direction normal to the line, and is equal to five one-hundredths of the shortest distance between an apex and the side of the triangle opposite that apex. In its broader aspects the invention is concerned with non-opaque terpolymers, and thus usually with terpolymers obtained from monomeric mixtures whose compositions are located in the area lying within 10 percent on each side of the azeotropic line. It is seldom permissible, however, to blend two terpolymers obtained from monomeric mixtures one of which is more than 5 percent away from the "azeotropic line" and the other of which is on the opposite side of the "azeotropic line." Terpolymers made by polymerizing a monomeric mixture having a composition lying in the area within 5 percent on each side of the line joining the two binary polymerization azeotrope compositions, are generally clearer than polymers made from similar monomeric mixtures lying farther away from and on the same side of the line. In most systems all terpolymers made from monomeric mixtures having compositions in the area lying within 5 percent on each side of the line are clear. In some systems the area of clarity may not extend as far as 5 percent from the line. Those skilled in the art, having had the benefit of the present disclosure, can easily determine by simple tests of the nature described herein which monomeric mixtures give clear terpolymers in a given polymerization system. In all events, the compositions of monomeric mixtures giving clear terpolymers will be found to constitute an area lying along the azeotropic line, and the mixtures giving non-opaque terpolymers to constitute a larger area lying along the "azeotropic line."

It should be pointed out that some systems involving three ethylenically unsaturated monomers do not consistently exhibit this behavior of clarity when the monomer compositions are taken from on or near the line joining the two binary azeotrope compositions. Such systems are called "irregular," as opposed to systems which do exhibit this property of clarity and which accordingly are called "regular" with respect to the Slocombe-Wesp rule of azeotropic line clarity. One skilled in the art, having had the benefit of the present disclosure, can readily determine by simple tests of the nature described hereinafter whether or not three particular monomers (a), (b) and (c) wherein (a) forms a binary polymerization azeotrope with (b) and with (c) but (b) and (c) do not form a binary polymerization azeotrope with each other, are irregular or regular with respect to said rule, i.e., whether they do not or do follow the said rule of azeotropic line clarity.

The reasons for the clarity of terpolymers made as described are not known. The line joining the two binary azeotrope compositions, although I have termed it the "azeotropic line," does not represent what might be called a series of three-component azeotropes. From much detailed data that have been obtained, the relative proportions of the three monomers in terpolymers made from monomeric mixtures lying along said line are not identical to the monomeric mixture from which the terpolymer is being prepared. In other words, during the course of a batch polymerization of a monomeric mixture whose composition is taken from the line, the composition of residual monomeric material drifts and the terpolymers so formed are not homogeneous mixtures of polymer molecules all of which contain monomer units in the same ratio, but rather are mixtures of polymer molecules having varying proportions of the three monomer units therein. No heretofore known scientific facts or theories of interpolymerization explain the discovery. However, regardless of the various reasons for believing that terpolymers made from compositions lying along the line as aforesaid would be heterogeneous, and regardless of the actual reasons for the clarity of such terpolymers, it is apparent that the discovery of this principle makes possible the production of clear terpolymers with obvious attendant advantages especially in films and molded articles made from the terpolymers.

The accompanying drawings are triangular coordinate graphs showing some three-component monomeric systems that follow the rule of clarity on being subjected to free-radical-initiated batch polymerization. The subject matter of each figure is tabulated in detail hereinafter.

In order to obtain terpolymers which can be blended in accordance with the present invention, one can subject a given monomeric mixture consisting of three monomers, selected as described herein, to a batch polymerization and carry the polymerization reaction to complete or essentially complete, say 90 to 100 percent, conversion of all of the monomers and yet obtain a clear solid resinous terpolymer. If desired, the polymerization can be stopped at any point short of completion so long as polymerization conditions are such as to produce solid terpolymer, but this is not necessary in order to obtain a clear terpolymer and would seldom be advantageous. The higher the degree of conversion of monomeric mixtures, the greater the advantages of the invention. This is because the greatest extent of heterogeneity is found with complete conversion to polymers. A high conversion, i.e., at least 50 weight percent conversion and preferably at least 80 weight percent conversion, is preferred in preparing polymers to be used in practicing the invention. However, some of the benefits of the invention may be realized even where the percentage conversion is as low as 20 percent. With very low conversions, the polymer formed tends to approach the perfect homogeneity existing in the first infinitely small increment of polymer formed. As pointed out above, commercial practicality requires that conversion be carried to a value more than a few percent, hence introducing the lack of homogeneity which up to the time of the inventions described in said copending applications, the art had not known how to avoid other than by techniques such as gradual monomer addition. It is to be recognized that the extent of the area of clear terpolymers, lying along the line joining the two binary polymerization azeotrope compositions, is dependent not only on the particular polymerization system but also on the percentage conversion, said area being the greater the lower the percentage conversion, and the smaller the higher the percentage conversion. It is observed that the terpolymers become clearer as the composition of the monomeric mixture approaches the line joining the two binary azeotrope compositions, the general rule being that the clearest terpolymers are those derived from monomeric compositions lying on the line.

The polymer blends of the present invention are preferably prepared from terpolymers derived from monomeric compositions on the azeotropic line, or at least within the area of clear terpolymers lying along the line. In less preferred aspects it is permissible to employ terpolymers prepared from monomeric mixtures whose compositions lie farther away from the "azeotropic line" and thus may be hazy or even turbid, so long as they are not opaque, and so long as the two or more polymers employed in the blend are still compatible.

It is usually desirable that three-component monomeric mixtures used to prepare terpolymers employed in the invention contain at least 2 weight percent, and preferably at least 5 weight percent, of the monomer present in the smallest amount. In the case of two-component monomeric mixtures used to prepare copolymers employed in the invention, the proportions of the two monomers are fixed by the particular monomer pair since the mixture is the one giving the binary azeotropic copolymer, although a small variation in either direction from the exact azeotropic proportion is permissible without departing from the intent of the invention. It may be mentioned here that the discussions given herein with respect to reaction variables such as conversion, catalysts, and the like to be employed in preparing terpolymers are also applicable to preparing the binary azeotropic copolymers.

The invention is broadly applicable to the use of terpolymers obtained by any free-radical-initiated interpolymerization of three-component monomeric mixtures containing the monomer combinations and in the proportions set forth herein, provided the polymerization is carried out by a batch procedure. By this it is meant that all of the monomeric materials to be employed are introduced simultaneously in the desired proportions into the polymerization reaction system. Ordinarily a single charge of monomeric materials will be placed in a reaction vessel and the single charge subjected to polymerization conditions until the polymerization is substantially complete. However, it is not outside the scope of the invention to use terpolymers obtained by introducing continuously a monomeric mixture containing the three monomers in fixed proportions into a flow-type polymerization system, whereby the initial polymerizable mixture passes away from its point of introduction and ultimately is recovered as polymer. This can be accomplished by continuous flowing of the monomeric mixture into the first of a series of polymerization reaction vessels with continuous flow of reaction mixture from one vessel to another along a series of two or more such vessels with ultimate recovery of polymer from the last in the series. Those skilled in the art will understand that this operation is essentially a batch operation in the sense that additional monomeric material of composition different from the original mixture is not introduced into a partially polymerized material. Thus, the term "batch polymerization," as used herein, means a polymerization which does not involve the gradual or incremental or subsequent addition of a monomer or monomers having a composition different from the initial monomeric mixture.

The polymerizations are perhaps most advantageously effected by the mass or bulk polymerization procedure. In such procedure the reaction mixture is free from added solvent or other reaction medium and consists solely of monomers, resultant polymers, and catalyst and regulator, if any. An important advantage is that such a mass polymerization can be effected to produce a clear terpolymer in a situation in which it is impossible to use the gradual monomer addition technique discussed above.

If desired, the interpolymers used in the present invention can be made by the suspension or the emulsion polymerization techniques. For suspension polymerization a reaction medium such as water is used together with a small amount of suspending agent, for example tricalcium phosphate, carboxymethylcellulose, etc., to give a suspension of particles of initial monomeric mixture, which particles are not of such small size as to result in a permanently stable latex. Where the particles are of quite large size, this type of polymerization is often called "pearl" polymerization. To effect emulsion polymerization sufficient amount of emulsifying agent, for example a water-soluble salt of a sulfonated long chain alkyl aromatic compound, a surface active condensation product of ethylene oxide with long chain aliphatic alcohols or mercaptans, etc., is employed along with vigorous agitation whereby an emulsion of the reactants in water is formed and the product is obtained in the form of a latex. The latex can then be coagulated if desired by known methods and the polymer separated from the water. For some applications the latices can be employed directly as for example for forming a film, and the resulting film after evaporation of the water will be clear when the polymers are made in accordance with the rules set forth herein. The emulsion technique has certain advantages particularly in that a very high degree conversion of the monomers is obtained with considerable rapidity, since the heat of reaction is easily carried off by indirect heat exchange with the reaction mixture which contains a considerable proportion of water. Such polymerizations are often effected with redox-type catalyst systems at moderate temperatures of say 60° C. on down to 0° C. and below.

The polymers used in the present invention can also be made in the presence of an added organic solvent. It should be recognized however that the presence of such a solvent ordinarily results in a polymer of lower molecular weight than that obtained in the absence of the solvent.

Conventional recipes and procedures for effecting mass, solvent, suspension and emulsion polymerizations are so well-known to those skilled in the art, that they need not be further detailed here.

From the foregoing, it will be apparent that the term, "monomeric mixture," as used in the claims refers only to the polymerizable monomeric materials used in the process, and that additionally solvents, aqueous reaction media, catalysts, etc., can be present or not in the reaction mixture as may be desired in any particular case. In other words, in the claims "monomeric mixture" is not necessarily synonymous with "reaction mixture."

Polymerization can be effected by any of the well-known free radical mechanisms. The polymerization is initiated and carried on by virtue of free radicals, which can be derived from the monomers themselves on simple heating of the monomeric mixture to a suitable temperature, or can be derived from added free-radical-supplying catalysts, especially the "per" compounds and the "azo" compounds, or can be derived by ultraviolet or other irradiation of the reaction mixture with or without the presence of photosensitizers, e.g., organic disulfides. Often it is sufficient to carry out "thermal" polymerizations in which the polymerization reaction is initiated and maintained merely by heating the monomeric mixture in the absence of any added catalyst. In many instances it will be desired to add a suitable polymerization catalyst, in which case sufficient catalyst is employed to give a desired reaction rate. Suitable catalysts are of the free-radical-promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include benzoyl peroxide, ditertiary butyl peroxide, tertiary butyl hydroperoxide, diacetyl peroxide, diethyl peroxycarbonate, 2-phenyl propane-2-hydroperoxide (known also as cumene hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N— bonded to one or two organic radicals, preferably at least one of the bonds being to a tertiary carbon atom. By way of example of suitable azo-type catalysts can be mentioned $\alpha,\alpha'$ - azodiisobutyronitrile, p - bromobenzenediazonium fluoborate, N-nitroso - p - bromoacetanilide, azomethane, phenyldiazonium halides, diazoaminobenzene, p-bromobenzenediazonium hydroxide, p-tolyldiazoaminobenzene. The peroxy-type or azo-type polymerization catalyst is used in small but catalytic amounts, which are generally not in excess of one percent by weight based upon the monomeric material. A suitable quantity is often in the range of 0.05 to 0.5 percent by weight.

Photopolymerization is another suitable procedure for preparing polymers used in the present invention. This is ordinarily accomplished by irradiating the reaction mixture with ultraviolet light. Any suitable source of light is employed having effective amounts of light with wave lengths of 2,000 to 4,000 Angstrom units. The vessel in which the polymerization is conducted should be transparent to light of the desired wave length so that the light can pass through the sides of the container. Suitable glasses are available commercially and include borosilicate ("Pyrex"), "Vycor," and soft glass. Alternatively, the source of light can be placed directly over the surface of the monomer in a container or can be placed within the reaction mixture itself. In some instances it is helpful to add a material that can be termed a photosensitizer, i.e., a material which increases the rate of photopolymerization, for example organic disulfides as described in U.S. Patent No. 2,460,105.

Choice of a suitable temperature for a given polymerization will readily be made by those skilled in the art having been given the benefit of the present disclosure. In general, suitable temperatures will be found within the range of 0° C. to 200° C., although temperatures outside this range are not beyond the scope of the invention in its broadest aspects. The time required for complete polymerization will depend not only upon the temperature but also upon the catalyst if any is employed, the ability of the system to remove heat of polymerization, and the particular monomers employed. The examples set forth hereinafter give some illustrative information as to reaction times for particular polymerizations.

The term "triangular coordinate graph" as used herein is well understood. Such a graph is sometimes called a "trilinear diagram." The accompanying figures are examples of such graphs and the use of same. However, for the sake of completeness the following statement can be made concerning the character of such triangular graphs. The graph is an equilateral triangle, divided off by three series of parallel lines each series being parallel to one side of the triangle. The distance between an apex of the triangle and the side opposite that apex represents variations in percentages of the component designated by that apex varying from 100 percent to 0 percent in equal increments running from the apex to the opposite side of the triangle. For example, if the distance between the apex and the side of the triangle opposite the apex is divided into 100 equal parts by lines passing across the triangle and parallel to said side, each line represents 1 percent of the component for which that apex is designated. Thus, any point within the triangle represents a single three-component composition, the indicated percentages of the three components totalling 100 percent.

As an aid in the choice of suitable proportions of monomers for polymerization the following data on reactivity ratios of certain monomer pairs are presented by way of example. The values given are considered the best ones represented in the literature or otherwise known (see "Copolymerization" by Alfrey, Bohrer and Mark, Interscience Publishers, Inc., 1952, pp. 32–43). In many instances an attempt is made to set forth an approximate order of accuracy. These latter figures, expressed as plus or minus certain values, should not however be given too much credence since such attempts to evaluate possible errors are dependent to a considerable extent on subjective evaluation of the data. Most of the values for reactivity ratios given are for moderate temperatures, say betwen about room temperature (20° C.) and 100° C. Of course, the value of the reactivity ratios for a monomer pair is a function of temperature but the variation in reactivity ratios with temperature is quite small and is of little importance unless the polymerization is to be carried out at temperatures considerably removed from those mentioned. Likewise, the reactivity ratios given are for atmospheric or autogenous pressure. Only if the polymerization pressure is to be quite considerably increased will there be an important change in the value of the reactivity ratios. It may also be pointed out that in the case of highly water-soluble monomers the apparent reactivity ratio values may be shifted somewhat from those given, when polymerization is effected in an aqueous system. Those skilled in the art, having been given the benefit of the present disclosure, will be able to evaluate the effect, if any, of reaction conditions on the values given herein and determine the extent of such effect. Similarly, those skilled in the art can determine by well-known procedures the correct reactivity ratios for monomer pairs not specifically set forth in the following tabulation, which tabulation is given by way of example of some but not all of the monomers that are the subject matter of the present invention.

In the following tabulation each monomer in a pair is designated as $M_1$ or $M_2$. Substitution of the values for $r_1$ and $r_2$ in the equation given above for the binary polymerization azeotrope composition permits an immediate determination of the proper location for the two points to be placed on the triangular coordinate graph, between which points is drawn the line of clear terpolymers. Whenever weight percent rather than mole percent is desired as a matter of convenience, mole percentages of the binary azeotrope compositions are easily converted to weight percent by use of the molecular weights of the particular $M_1$ and $M_2$.

TABLE OF REACTIVITY RATIOS

| $M_1$ | $M_2$ | $r_1$ | $r_2$ |
| --- | --- | --- | --- |
| Acrylonitrile | α-Acetoxystyrene | 0.03 ±0.01 | 0.4 ±0.05 |
| Do | α-Methylstyrene | 0.06 ±0.02 | 0.1 ±0.02 |
| Styrene | Acrylonitrile | 0.41 ±0.08 | 0.03 ±0.03 |
| Do | Diethyl fumarate | 0.30 ±0.02 | 0.07 ±0.007 |
| Do | Dimethyl fumarate | 0.21 ±0.02 | 0.025±0.015 |
| Do | Methacrylic acid | 0.15 ±0.01 | 0.7 ±0.05 |
| Do | Methacrylonitrile | 0.30 ±0.10 | 0.16 ±0.06 |
| Do | Methyl methacrylate | 0.520±0.026 | 0.460±0.026 |
| Do | Methyl vinyl ketone | 0.29 ±0.04 | 0.35 ±0.02 |
| Do | Monoethyl fumarate | 0.18 ±0.10 | 0.25 ±0.10 |
| Do | Monoethyl maleate | 0.13 ±0.01 | 0.035±0.01 |
| Do | Acrylic acid | 0.15 ±0.01 | 0.25 ±0.02 |
| α-Methylstyrene | Methacrylonitrile | 0.12 ±0.02 | 0.35 ±0.02 |
| Butadiene | do | 0.36 ±0.07 | 0.04 ±0.04 |
| Methyl methacrylate | α-Methylstyrene | 0.50 ±0.03 | 0.14 ±0.01 |
| Vinyl acetate | Diethyl fumarate | 0.011±0.001 | 0.444±0.003 |
| Vinyl chloride | do | 0.12 ±0.01 | 0.47 ±0.05 |

Where $M_1$ is to be vinyltoluene or vinylxylene, the same reactivity ratios are used, on the assumption that the reactivity ratios for such systems do not differ essentially for the purposes of this invention from the reactivity ratios of the corresponding systems wherein styrene is $M_1$. This assumes that the introduction of one or two methyl groups into the aromatic nucleus of styrene does not greatly alter the polarity and steric properties of the ethylenic double bond. Likewise, when isoprene is to be used, the reactivity ratios are assumed not to differ essentially for the purposes of this invention from the above reactivity ratios involving butadiene. This assumes that the change in the molecule from butadiene to isoprene does not greatly alter the polarity and steric properties of the ethylenic double bond. Similarly, when an alkyl methacrylate other than methyl methacrylate is to be used, the reactivity ratios are assumed not to differ essentially for the purposes of this invention from the above reactivity ratios involving methyl methacrylate. This assumes that a moderate increase in the chain length of the alkyl group in the alkyl methacrylates over the single carbon atom in the methyl group of methyl methacrylate, or a branching of the chain if such is present, does not greatly alter the polarity and steric properties of the ethylenic double bond. Similar assumptions are made with respect to the various dialkyl fumarates as a group, with respect to the various monoalkyl fumarates as a group, and with respect to the various monoalkyl maleates as a group. Thus, although the reactivity ratios for styrene/dimethyl fumarate and for styrene/diethyl fumarate appear to differ considerably from each other, the values of the binary azeotrope compositions for these two systems calculated from said different reactivity ratios, given in the table above, differ from each other by only two percentage points. Anyone skilled in the art, desiring greater precision, can use well-known standard procedures to determine the reactivity ratios for a given binary system not previously reported in the art. With alkyl ester monomers having fairly long chain alkyl groups, the reactivity ratios tend to differ considerably from those for the corresponding methyl or ethyl monomer and hence should be individually determined. In the case of ester monomers, e.g., dialkyl fumarates, alkyl methacrylates, monoalkyl fumarates, and monoalkyl maleates, special preference is given to the lower alkyl groups. Alkyl groups containing from 1 to 4 carbon atoms are particularly valuable, viz., methyl, ethyl, n-propyl, isopropyl, n-butyl, iso-butyl, sec.-butyl, tert.-butyl. However, the invention is also applicable to the alkyl compounds mentioned, that contain alkyl groups of up to 8 carbon atoms per alkyl group and even higher. In the case of dialkyl fumarates, there are included those dialkyl fumarates wherein both alkyl groups are the same and those dialkyl fumarates wherein two different alkyl groups are present in the molecule.

In certain suitable terpolymer systems, the monomers (b) and (c) are each chosen from the same group which includes one or more alkyl ester monomers generically, for example, the system wherein the monomeric mixture consists of (a) a monomer selected from the group consisting of styrene, vinyltoluene and vinylxylene, (b) a monomer selected from the group consisting of acrylic acid, methacrylic acid, dialkyl fumarate, methacrylonitrile, monoalkyl fumarate, and monoalkyl maleate and (c) a different monomer selected from said (b) group. It is to be understood that in such instances (b) and (c) in a given mixture of three monomers can be members of the same general class differing only in the alkyl group; for example, in a single monomeric mixture from the above-mentioned system, the (b) and (c) monomers can be monomethyl fumarate and monobutyl fumarate, or can be dimethyl fumarate and dipropyl fumarate, or can be monobutyl maleate and monoisopropyl maleate, etc.

In the following examples it will be appreciated that variations can be made in the particular choice of monomers, proportions, and methods of polymerization in accordance with the general teachings of the present specification, and that the examples are not to be taken as coextensive with the invention in its broadest aspects.

*Example 1*

This example concerns the ternary system acrylonitrile/styrene/α-methylstyrene. The data obtained in this example are set forth graphically in FIGURE 1 of the drawing.

PART A

The composition of the acrylonitrile/α-methylstyrene binary azeotrope was calculated in the following manner according to the article by Mayo and Walling, Chemical Reviews 46, 199 (1950).

Acrylonitrile ($M_1$)

α-Methylstyrene ($M_2$)

$r_1 = 0.06$ $r_2 = 0.1$ $$\frac{[M_1]}{[M_2]} = \frac{0.1 - 1}{0.06 - 1} = \frac{0.9}{0.94} = 0.96$$

$[M_1] + [M_2] = 100$ $[M_2] + 0.96[M_2] = 100 = 1.96[M_2]$ $[M_2] = 51$ mole percent α-methylstyrene $[M_1] = 49$ mole percent acrylonitrile Molecular weight of α-methylstyrene = 118.17

Molecular weight of acrylonitrile = 53.06

$0.51 \times 118.17 = 60.3$ grams α-methylstyrene $0.49 \times 53.06 = 26.0$ grams acrylonitrile 86.3 grams mixture $(60.3 \times 100)/86.3 = 70$ weight percent α-methylstyrene $(26.0 \times 100)/86.3 = 30$ weight percent acrylonitrile The foregoing calculations give the composition of the acrylonitrile/α-methylstyrene binary polymerization azeotrope as 30 weight percent acrylonitrile, 70 weight percent α-methylstyrene.

By the same procedure, the binary polymerization azeotrope for acrylonitrile/styrene was calculated to be 24 weight percent acrylonitrile, 76 weight percent styrene.

A series of monomeric mixtures was made up, each mixture being prepared by admixture of the individual pure monomers in a "Pyrex" test tube 150 mm. long and having an internal diameter within the approximate range of 14 to 18 mm., usually about 16 mm. Each test tube containing the particular monomeric mixture was flushed with nitrogen in order to remove any air present in the gas space above the liquid, and the test tube was then sealed off at the top by heating the tube under nitrogen and pulling it out in the flame to seal the tube completely. Each particular monomer mixture was prepared and polymerized in duplicate.

After the various tubes containing the monomeric mixtures had been prepared, they were placed in a 90° C. constant temperature bath, and held there for 24 hours. At the end of that period they were moved to a 120° C. constant temperature bath and held there for 24 hours. At the end of this second 24-hour period the tubes were removed and placed in an oven maintained at 180° C. and held therein for 8 hours.

The various monomeric compositions are set forth in detail in Table I-A which follows. Table I-A designates each different mixture by sample number. Samples Nos. 3, 8, 13, 38, 29, 33 and 40 constitute a series of samples having compositions falling on or nearest to the straight line connecting the two binary azeotrope compositions whose percentage values were calculated as given above, when plotted on triangular coordinates. See FIGURE 1. All of the samples were prepared with compositions which vary so that several series of from three to seven different compositions running along constant α-methylstyrene composition lines and cutting across the line joining the two binary azeotropes could be examined.

At the end of the polymerization cycle described above, all the polymers formed in the sealed tubes were carefully examined visually by the same observer, looking through the diameter of the cylindrical body of polymer obtained by breaking and removing the glass tube; this cylinder of polymer conformed to the internal shape and size of the glass tube. These visual observations were checked by other observers. It was determined that the clarity noted for polymer samples is not significantly affected by variation in polymer cylinder diameter within the range of about 14 to 18 millimeters. It is to be understood that where clarity of polymers is discussed herein, reference is made to the appearance on looking through a cylindrical body of the polymer having a diameter within the approximate range of 14 to 18 millimeters, unless a film of polymer is definitely referred to. The following words were adopted for describing the clarity of polymers:

C—Clear—essentially crystal clear
H—Hazy—some cloudiness but slight
T—Turbid—moderately cloudy
O—Opaque—dense cloudiness-similar to milk glass in appearance "Clear" means relatively free from gross amounts of haze but allows the presence of slight haze to be detected with close examination in strong light. Specific notation that a sample was "crystal" clear means not only that no haze was apparent to the observer, but also that the sample showed a sparkling appearance as found in high quality crystal glassware.

The alcohol solubles content of some of the polymers was determined, using the following standard procedure:

An 0.3 gram-sample of polymer is dissolved in 20 ml. acetone (or other suitable solvent), then the polymer is precipitated by adding 250 ml. absolute ethanol to the solution; the precipitate is coagulated, filtered off, dried and weighed. The average of two determinations is given. The alcohol solubles content (ASC) gives an approximate measure of the extent of conversion. The material soluble in alcohol is principally monomer; only very low molecular weight polymers, e.g., dimers and trimers are soluble in alcohol. Thus 100–ASC approximates the percentage conversion.

The specific viscosity was determined on the total polymer, and on the undissolved residue from the alcohol solubles test, in a number of instances. The specific viscosity determinations were made on an 0.1 weight percent solution of polymer in dimethylformamide.

TABLE I-A.—ACRYLONITRILE/STYRENE/α-METHYLSTYRENE TERPOLYMERS

| Sample No. | Composition, weight percent α-MS/AN/S | Appearance | | Alcohol solubles content, weight percent | Specific viscosity | |
|---|---|---|---|---|---|---|
| | | Clarity | Color | | Total polymer | Alcohol insoluble Residue |
| 1 | 5/35/60 | T—Turbid | L. yellow | | | |
| 2 | 5/30/65 | C—Clear | Colorless | | | |
| 3 | 5/25/70 | do | do | 2.70 | 0.174 | 0.180 |
| 4 | 5/20/75 | T—Turbid | White | | | |
| 5 | 5/15/80 | O—Opaque | do | | | |
| 6 | 15/35/50 | T—Turbid | L. yellow | | | |
| 7 | 15/30/55 | C—Clear | Colorless | | | |
| 8 | 15/25/60 | do | do | 5.15 | 0.131 | 0.138 |
| 9 | 15/20/65 | T—Turbid | White | | | |
| 10 | 15/15/70 | O—Opaque | do | | | |
| 11 | 25/35/40 | T—Turbid | L. yellow | | | |
| 12 | 25/30/45 | C—Clear | Colorless | | | |
| 13 | 25/25/50 | do | do | 7.14 | 0.104 | 0.101 |
| 14 | 25/20/55 | T—Turbid | White | | | |
| 15 | 25/15/60 | O—Opaque | do | | | |
| 16 | 35/35/30 | T—Turbid | L. yellow | | | |
| 17 | 35/30/35 | C—Clear | Colorless | | | |
| 18 | 35/25/40 | do | do | | | |
| 19 | 35/20/45 | O—Opaque | White | | | |
| 20 | 35/15/50 | do | do | | | |
| 21 | 45/40/15 | T—Turbid | Yellow | | | |
| 22 | 45/35/20 | H—Hazy | do | | | |
| 23 | 45/30/25 | C—Clear | Sl. yellow | | | |
| 24 | 45/25/30 | do | do | | | |
| 25 | 45/20/35 | O—Opaque | White to Sl. yellow | | | |
| 26 | 45/15/40 | do | do | | | |
| 27 | 55/40/5 | do | Yellow | | | |
| 28 | 55/35/10 | H—Hazy | do | | | |
| 29 | 55/30/15 | C—Clear | Sl. yellow | 10.91 | 0.069 | 0.067 |
| 30 | 55/25/20 | do | do | | | |
| 31 | 55/20/25 | O—Opaque | White to sl. yellow | | | |
| 32 | 65/35/0 | C—Clear | Yellow | | | |
| 33 | 65/30/5 | do | L. yellow | 13.88 | 0.058 | 0.058 |
| 34 | 65/25/10 | do | Sl. yellow | | | |
| 35 | 65/20/15 | C—Clear (V. sl. haze) | do | | | |
| 36 | 75/25/0 | C—Clear | do | | | |
| 37 | 75/20/5 | do | do | | | |
| 38 | 35/27/38 | do | Colorless | 8.44 | 0.094 | 0.099 |
| 39 | 45/28/27 | do | Sl. yellow | 9.10 | 0.078 | 0.083 |
| 40 | 69/31/0 | do | L. yellow | 14.44 | 0.055 | 0.057 |
| 41 | 0/24/76 | do | Colorless | | | |

α-MS = α-Methylstyrene  AN = Acrylonitrile
S = Styrene  L. = Light
Sl. = Slightly  V. = Very Referring now to FIGURE 1 of the drawings, the clarity data given in Table I-A have been designated alongside of each of the corresponding ternary monomeric mixture compositions indicated by the point on a triangular coordinate plot. The various numerals on FIGURE 1 located adjacent the respective points refer to the sample number in Table I-A. All of the points marked "C" were rated as clear, and of these all were crystal clear with the exception of the sample represented by point 35 which had a very slight haze but not sufficient to consider it other than essentially clear or to bring it from the clear rating into the hazy rating. Examination of FIGURE 1 immediately shows that terpolymers prepared from monomeric mixtures having compositions lying on the line joining the two binary azeotrope compositions were clear, as were terpolymers within the area lying along said line. However, going appreciably beyond 5 percent on each side of the line the terpolymers become non-clear. Opacity increases more quickly below the line as higher concentrations of styrene and lower concentrations of α-methylstyrene are approached and to a lesser extent as lower concentrations of acrylonitrile are approached, than it does on the opposite side of the line and at the lower end of the line approaching zero percent styrene. Thus, in the present system acrylonitrile/styrene/α-methylstyrene, point 4, which is 4 percent away from the line on the lower side of the line, and point 9, which is 5 percent away from the line on the same side, are opaque, so that the area of perfectly clear terpolymers along the line does not extend quite to the 5 percent line in this portion of the graph. It can be stated generally that on the lower side of the line (the side opposite the 100 percent acrylonitrile apex) all polymers within 3 percent of the line are clear and many polymers farther away than 5 percent are also clear, especially in the direction of decreasing styrene content. All polymers on the opposite side of the line and within 5 percent of the line are clear as are some more than 5 percent away from the line. With respect to points 4 and 9 it will be noted even here that these points are much clearer, being only turbid, than are the adjacent points 5 and 10 respectively which are farther away from the line and are opaque. The appearance of opacity and turbidity closer to the line in some regions than in other regions are consistent with most physical phenomena which seldom exhibit perfect regularity. The data demonstrate that terpolymers made from ternary monomeric mixtures whose composition is taken from along the line and from a significant area lying on each side of the line are clear, and thus constitute a new group of terpolymers having the extremely important property of clarity. Another interesting thing to note is that such terpolymers ordinarily have minimum color. This is easily seen by observing in Table I-A the recorded color of each of the samples and comparing it with the location on FIGURE 1. The samples containing the larger proportions of acrylonitrile appear to have the greatest amount of yellow color. Clear samples lying within the area of clear terpolymers along the line have no color provided they contain less than 40 weight percent α-methylstyrene, while those containing more than 40 weight percent α-methylstyrene have a slight yellow color. Of these latter samples, the samples on and nearest the line are less colored than those farther away from the line.

In FIGURE 1 the dashed lines drawn parallel to the line joining the two binary azeotrope compositions are 5 percent on each side of the line, i.e., each is a distance from the line equal to 5 percentage points of composition as determined by dividing the distance between an apex and the center of the opposite side of the triangle into 100 equal equidistant parts; the dashed lines can also be said to be 5 graphical units from the line joining the two binary azeotrope compositions.

PART B

Blends of various polymers whose preparation and characteristics are described above in Part A of this example, were prepared by making up 10 percent solutions (10 parts by weight polymer in 90 parts by weight solvent) and then mixing approximately equal volumes of the solutions of the individual polymers as desired. The solvents used in these particular tests were either acetone or methyl ethyl ketone.

The appearance of the solutions when mixed was observed. Films were cast from the mixed solutions by pouring out a portion on a glass plate (microscope slide) and permitting the solvent to dry by evaporation at room temperature. The films thus formed ranged from 0.001 to 0.004 inch in thickness. These observations were compared with those on the solutions of the single polymers and on films cast from such solutions of the single polymers.

Compatible polymers gave single phase, clear solutions when mixed, and the film cast from the mixture remained clear after drying. The polymers that were moderately incompatible gave solutions that in gross appearance were clear and did not show phase separation, but a film cast from the mixture was hazy after drying. Still less compatible polymers gave hazy solutions that would usually separate into two or more phases on standing, and gave very hazy and inhomogeneous films when cast.

The results of these tests are set forth in Table I-B, wherein the appearance of the cast film is rated as follows:

FILM HAZE CODE nh ............................. No haze (clear).
+ .............................. Slight haze.
++ ............................. Medium haze.
+++ ............................ Strong haze.

This Film Haze Code refers to the appearance of film cast from solution in an organic solvent on a glass microscope slide and having a thickness after drying, i.e., after evaporation of solvent of from 1 to 5 mils (i.e., from 0.001 to 0.005 inch thick) as viewed with the naked eye by transmitted light. It should not be confused with the code given hereinbefore in Part A of this example with respect to clarity as determined by the appearance of polymers in the form of 16 millimeter diameter cylinders. Thus, for example, polymer number 10 (polymer sample numbers are maintained uniform in Parts A and B of this example) was rated "O—Opaque" as it appeared in the massive or bulk form of a 16 millimeter cylinder in Part A, and the film cast from this polymer in Part B had a film haze code rating of "++"; polymer number 9 in the massive form of a 16 millimeter cylinder was rated "T—Turbid" but the cast film was rated "nh," i.e., no haze or clear.

For the purposes of this invention, polymer blends are compatible if the cast film is essentially free from haze, i.e., has a rating of "nh" by the film haze code. Thus, for the purpose of forming films especially, it is sometimes permissible to employ as a component of the polymer blend a terpolymer that in the bulk form of a 16 millimeter cylinder is not clear but rather may be hazy or turbid so long as it is not opaque. Where the polymer blends are to be used in bulk forms, such as molded articles and the like, and without fillers or other pigmentation, it is usually preferred to use as components of the blend only terpolymers that are clear in their bulk appearance.

TABLE I–B.—INTERPOLYMER COMPATIBILITY TESTS

| Polymers | | | | Polymer blends | |
|---|---|---|---|---|---|
| Polymer No. | Monomer weight ratio αMS/ AN/S | Appearance 16 mm. cylinder (Table I) | Appearance of film, haze code value | Polymers combined | Appearance of film, haze code value |
| 10 | 15/15/70 | Opaque | ++ | 10+ 9 | ++ |
| 9 | 15/20/65 | Turbid | nh | 10+ 8 | ++ |
| 8 | 15/25/60 | Clear | nh | 10+ 7 | +++ |
| 7 | 15/30/55 | do | nh | 9+ 8 | nh |
| | | | | 9+ 7 | ++ |
| 41 | 0/24/76 | do | nh | 8+ 7 | nh |
| 3 | 5/25/70 | do | nh | | |
| 33 | 65/30/ 5 | do | nh | 8+41 | nh |
| 40 | 0/31/69 | do | nh | 8+ 3 | nh |
| | | | | 8+33 | nh |
| | | | | 8+40 | nh |
| Film haze code | | | | 41+ 3 | nh |
| | | | | 41+33 | nh |
| nh | No haze (clear) | | | 41+40 | nh |
| + | Slight haze | | | 3+33 | nh |
| ++ | Medium haze | | | 3+40 | nh |
| +++ | Strong haze | | | 33+40 | nh |
| | | | | 41+3+33+40 | nh |

The compositions of the monomeric mixtures from which the polymer samples in Table I–B were obtained have been circled in FIGURE 1, and a consideration of the data in Table I–B is facilitated by observing the positions of the compositions in FIGURE 1.

Polymer 10 was an opaque terpolymer obtained from a monomeric mixture whose composition lies a considerable distance from the line joining the two binary polymerization azeotrope compositions, or "azeotropic line." Its cast film was rated "++," or "medium haze." When blended with polymer 9, whose composition lies closer to the azeotropic line, the film had the same rating. Similarly, when polymer 10 was blended with polymer 8, which is a polymer on the azeotropic line, the same film rating was achieved. However, when polymer 10 was blended with polymer 7, whose composition lies as close to the azeotropic line as that of polymer 9 but on the opposite side of the line, and thus is farther removed from the composition of polymer 10, the blend of the two polymers was even more incompatible as shown by the "+++" rating.

Polymer 9 was a terpolymer prepared from a monomeric mixture lying about 5 graphical units from the azeotropic line and which was turbid, but not opaque, in the massive form of a 16 mm. diameter cylinder. When cast as a film it was rated "no haze." This polymer 9 was blended with polymer 8 whose composition lies on the azeotropic line, and the two polymers were compatible as shown by the "nh" rating of the cast film. However, when polymer 9 was blended with polymer 7, which is a clear terpolymer lying about 5 graphical units from the azeotropic line but on the opposite side thereof, a definitely incompatible mixture resulted since the film was rated "++." Thus, while both polymers 9 and 7 were obtained from monomeric mixtures within the area of nonopaque terpolymers lying along the azeotropic line, their compositions were to far distant from each other and their blend was not compatible.

On the other hand, when polymer 7 (which it will be noted was incompatible both with polymer 10 and with polymer 9 was blended with polymer 8 whose composition lies on the azeotropic line, the blend was compatible (nh rating of film).

Polymer 8 was next separately blended with polymers 41, 3, 33 and 40. Polymer 8 was a clear terpolymer obtained from a monomeric mixture whose composition is on the azeotropic line. Polymers 3 and 33 were also clear terpolymers of composition lying on the azeotropic line, but near the opposite ends thereof, each containing only 5 weight percent of the monomer present in the smallest proportion. Their compositions, of course, were much farther removed on the triangular coordinate graph from the composition of polymer 8 than were the compositions of polymers 7, 9, and 10. Polymer 40 was approximately the binary polymerization azeotrope of acrylonitrile and α-methylstyrene (no styrene), and polymer 41 was the binary azeotrope composition of acrylonitrile and styrene (no α-methylstyrene). Now, despite the fact that the last two mentioned polymers were only binary polymers containing none of a third common monomer present in polymer 8, and despite the fact that all of these four polymers were far removed in composition from the composition of polymer 8, all the blends were compatible.

All the other possible combinations of any two of the polymers 41, 3, 33 and 40, all of whose compositions lay on the azeotropic line, were tested, and all the blends were compatible. This was true even for the extreme cases of binary polymer 41 and terpolymer 33 at practically opposite ends of azeotropic line, and terpolymer 3 and binary polymer 40 at practically opposite ends of the azeotropic line. It was even true in the case of the blend of the two binary azeotrope copolymers 40 and 41 which contain none of a third common monomer, i.e., no terpolymers with intermediate compositions could be present.

Finally, solutions of four different polymers as follows:

Polymer 41 in methyl ethyl ketone
Polymer 3 in acetone
Polymer 33 in acetone
Polymer 40 in methyl ethyl ketone were all mixed together and found to form a clear, single phase solution. The film cast from this solution was clear. It is interesting to note that the solution of these four different polymers was homogeneous even though the polymers had such widely varying compositions and two different solvents were present.

Additional tests, not reported in Table I–B, were made by mixing 10 percent solutions of polystyrene and of the binary azeotrope copolymer of styrene with acrylonitrile (polymer 41), and by mixing 10 percent solutions of polystyrene and of the binary azeotrope copolymer of α-methylstyrene with acrylonitrile (polymer 40). The mixtures obtained were both very turbid, and formed two liquid phases on standing. The films cast from these mixtures showed gross incompatibility as evidenced by the appearance of "islands" of one polymer dispersed throughout the matrix formed by the other polymer. When one of the dried films was stripped from the glass plate, many of the "islands" preferentially stuck to the glass giving a perforated matrix.

*Examples 2–22*

The foregoing Example 1 has presented in great detail procedures for determining monomer proportions within the area of non-opaque terpolymers lying along the "azeotropic line," in a particular system of three monomers wherein one of the monomers forms a binary polymerization azeotrope with each of the other two monomers while the latter two do not form a binary polymerization azeotrope with each other and wherein the monomers are regular in following the Slocombe-Wesp rule of azeotropic line clarity, and has demonstrated by detailed information that blends of two such terpolymers, or of such terpolymers with either one of the binary polymerization azeotrope copolymers, are compatible, and that such compatible blends can include three or more interpolymers satisfying the given requirements. The procedures and data are representative for all three-monomer systems satisfying the stated requirements. However, to avoid further lengthening of the present specification, the detailed instructions and data will not be repeated for all of the other examples but suffice it to say that in each of the following examples blends of terpolymers with each other, or with the binary azeotrope copolymers, prepared in accordance with the principles set forth herein are compatible.

In order to provide those skilled in the art with information regarding a variety of suitable three-monomer systems, data on a large number of such systems are presented in graphical form in Examples 2–22, inclusive, wherein for each example the correspondingly numbered figure of the drawing is to be referred to. It will be understood that in each of the figures, just as in FIGURE 1, the solid line joins the two binary polymerization azeotrope compositions, the dashed lines are 5 graphical units distant from the azeotropic line, and the numbered points carrying clarity code letters represent monomer mixture compositions from which polymers were prepared and their clarity determined by visual examination of 16 mm. diameter cylinders in the manner described in Part A of Example 1 above.

Each of the examples falls under one of eight general (a), (b), (c) monomer systems, and are so listed in the following tabulation. The eight general systems in their order in the tabulation (together with the examples listed thereunder) are respectively specifically described in the following copending applications, to which reference is made for complete experimental details on preparation of the polymers: Serial No. 396,481, Serial No. 396,506 and Serial Nos. 396,482–7, inclusive. Said copending applications have now issued as United States patents, respectively bearing the following patent numbers: 2,851,446 issued September 9, 1958; 2,829,128 issued April 1, 1958; 2,829,125 issued April 1, 1958; 2,851,444 issued September 9, 1958; 2,854,439 issued September 30, 1958; 2,851,447 issued September 9, 1958; 2,851,448 issued September 9, 1958; 2,836,580 issued May 27, 1958.

In the examples, there are also listed a few compatible blends of specific polymers representative of the many compatible blends which satisfy the requirements of the present invention. Such blends can be prepared and compatibility demonstrated by the solution procedure set forth in Example 1–Part B. Just as in Example 1–FIGURE 1, the numerals designate the compatible polymer blends and correspond to the numerals on the figure in question showing by circled points the monomer mixture compositions yielding those polymers.

| Example-Figure | Monomers |
|---|---|
| | System {(a) Acrylonitrile<br>(b) α-Acetoxystyrene, α-methylstyrene, styrene, vinyltoluene, or vinylxylene<br>(c) A different monomer from (b) group} |
| 1–1 | Acrylonitrile, α-methylstyrene, styrene<br>See Example 1 above. |
| 2–2 | Acrylonitrile, styrene, vinyltoluene<br>1+3, 1+4, 3+4, 10+3 |
| | System {(a) Styrene, vinyltoluene or vinylxylene<br>(b) Acrylonitrile<br>(c) Dialkyl fumarate, methacrylic acid, methacrylonitrile, alkyl methacrylate, methyl vinyl ketone, monoaklyl fumarate, or monoalkyl maleate} |
| 3–4 | Styrene, acrylonitrile, diethyl fumarate<br>1+3, 1+19, 3+4, 3+19, 2+12, 13+15, 2+3+19 |
| 4–4 | Styrene, acrylonitrile, methyl methacrylate<br>1+2, 1+4, 2+4, 2+5, 3+11, 5+10 |
| 5–5 | Styrene, acrylonitrile, methyl ketone<br>10+1, 10+2, 1+3, 2+3 |
| 6–6 | Styrene, acrylonitrile, methacrylonitrile<br>1+3, 1+5, 3+5, 5+6, 4+10, 11+15, 1+3+6 |
| 7–7 | Vinylxylene, acrylonitrile, methyl methacrylate<br>1+2, 1+4, 2+5, 4+5, 3+7 |
| 8–8 | Styrene, acrylonitrile, monoethyl maleate<br>1+2, 1+3, 2+3, 3+4, 8+9 |
| 9–9 | Styrene, acrylonitrile, n-butylmethacrylate<br>2+4, 2+5, 4+5, 4+6, 2+3+4 |

| Example-Figure | Monomers |
|---|---|
| 10–10 | Styrene, acrylonitrile, i-propyl methacrylate<br>2+3, 2+4, 3+4, 4+6, 3+9, 1+2+3+4 |
| | System { (a) Styrene, vinyltoluene or vinylxylene<br>(b) Methyl vinyl ketone<br>(c) Acrylic acid, methacrylic acid, methacrylonitrile, alkyl methacrylate, monoalkyl fumarate, or monoalkyl maleate |
| 11–11 | Styrene, methyl vinyl ketone, acrylic acid<br>1+2, 1+3, 2+3, 3+4, 3+6 |
| 12–12 | Vinyltoluene, methacrylonitrile, methyl vinyl ketone<br>5+4, 4+3, 3+2, 4+2, 3+6 |
| 13–13 | Styrene, methyl methacrylate, methyl vinyl ketone<br>1+4, 2+4, 2+5, 4+5 |
| | System { (a) Styrene, vinyltoluene, or vinylxylene<br>(b) Acrylic acid, methacrylic acid, dialkyl fumarate, methacrylonitrile, monoalkyl fumarate or monoalkyl maleate<br>(c) A different monomer from (b) group |
| 14–14 | Styrene, methacrylic acid, diethyl fumarate<br>1+2, 1+4, 2+3, 2+4 |
| 15–15 | Vinyltoluene, methacrylic acid, methacrylonitrile<br>4+3, 4+2, 3+2 |
| | System { (a) Methacrylonitrile<br>(b) Styrene, vinyltoluene, vinylxylene, α-methylstyrene, isoprene or butadiene<br>(c) A different monomer from (b) group |
| 16–16 | Methacrylonitrile, vinyltoluene, isoprene<br>1+2, 1+4, 2+3, 3+4 |
| 17–17 | Methacrylonitrile, styrene, α-methylstyrene<br>6+7, 6+8, 7+8, 8+9, 13+9 |
| | System { (a) α-Methylstyrene<br>(b) Acrylonitrile<br>(c) Methacrylonitrile, alkyl methacrylates |
| 18–18 | α-Methylstyrene, acrylonitrile, methacrylonitrile<br>1+2, 1+3, 2+4, 3+5 |
| 19–19 | α-Methylstyrene, methyl methacrylate, acrylonitrile<br>22+1, 22+3, 1+4, 3+4, 9+10, 1+2+3 |
| | System { (a) Styrene, vinyltoluene or vinylxylene<br>(b) Alkyl methacrylate<br>(c) Acrylic acid, methacrylic acid, dialkyl fumarate, monoalkyl fumarate or monoalkyl maleate |
| 20–20 | Vinyltoluene, acrylic acid, methyl methacrylate<br>1+2, 1+4, 2+4, 4+5, 3+8 |
| 21–21 | Vinylxylene, methyl methacrylate, diethyl fumarate<br>5+4, 5+3, 4+2, 3+2, 7+13 |
| | System { (a) Dialkyl fumarate<br>(b) Styrene, vinyltoluene, vinylxylene, vinyl acetate or vinyl chloride<br>(c) A different monomer from (b) group |
| 22–22 | Diethyl fumarate, styrene, vinyl acetate<br>1+2, 2+3, 2+4, 1+3 |

The polymer blends of the present invention are particularly useful in the formation of films wherein compatibility provides the desirable attributes of clarity and often improved physical properties. They are also very useful in forming molded objects by compression or injection molding, shaping by extrusion, sheeting by extrusion or calendering, forming into fibers by extrusion or wet or dry spinning, and the like wherein homogeneity of polymer blend permits the attainment of desired physical characteristics by choice of particular polymers used in the blend without the adverse effects customarily encountered in blending of polymers. In many such shaped articles and forms the matter of clarity is of interest and value and the preferred blends are clear even in massive shapes. It should be pointed out that even where films or shaped articles, fibers, filaments and the like are pigmented by the addition of inorganic or organic pigments or colorants, fillers, and the like so that clarity is masked, the compatibility of the polymer blends of the invention permit the attainment of physical properties within wide ranges of choice.

It will be understood that the term "a composition of matter comprising a compatible blend of polymers A and B," polymers A and B being further defined, includes not only a composition of matter consisting of polymers A and B and exhibiting compatibility by clarity of a cast film as described herein, but also permits the inclusion of colorants, fillers and the like as just described, stabilizers, plasticizers, solvents, other polymers, discrete fibers such as asbestos fibers or random or woven glass fibers, and the like as may be desired for a particular use amongst the great variety of uses that naturally are possible with the wide variety of polymer blends made available by the invention. It will also be understood that the term "a compatible blend of polymers A and B" is not limited to the blend of two such polymers but rather permits the inclusion of three or more satisfying the requirements set forth herein for compatible polymers.

Of particular interest is the fact that the compatibility of the polymers which are blended in accordance with the present invention permits their admixture with one or more organic liquids compatible with the blend. Such liquids may be present in a limited amount so that the admixture is still solid, in which case the liquids, usually high boiling, are considered as plasticizers or the liquids may be present in such large amount as to result in a normally liquid composition of matter whereby such liquids, either low boiling or high boiling, can then be termed solvents. A solvent-type plasticizer is generally used in these compositions; however, the use of a non-solvent type plasticizer, in part at least, is of definite interest in many instances. So also in the polymer solutions, a mixture of solvents may be used some components of which are good solvents for the polymers, whereas other components are relatively poor solvents or even non-solvents which, however, when used in minor proportions do not prevent solution of the polymers. As pointed out before, it is seldom that two different polymers can be found that can be dissolved together in a liquid without phase separation occurring. Hence, homogeneous single-phase solutions of two or more interpolymers chosen in accordance with the principles described herein constitute important embodiments of this invention.

Solutions of blended polymers made in accordance with the invention of course find great value as surface coating compositions in the paint and varnish industry, and as such often contain pigments and other conventional components of such compositions, and can also be used for such purposes as fabric coating, film casting, wet or dry spinning of fibers and filaments, and the like. Aqueous emulsions of such solutions, and for that matter of the polymers without solvent, are often suitable as surface coating compositions or for casting self-sustaining films. Polymerizable liquid monomers may be used as solvents for a mixture of two or more compatible polymers; subsequent polymerization of the monomeric solvent will produce a polyblend of the original compatible polymers dispersed in the final polymer mixture or a graft polymer blend whereby some of the monomer molecules have become grafted onto the preformed polymers. In other aspects of the invention, a combination of compatible polymers chosen in accordance with the invention can be dissolved in a lubricating oil or hydraulic fluid, either natural such as hydrocarbon oils and fluids, or artificial such as various esters and the like, to confer desirable viscosity properties, anti-foaming properties, and the like, wherein it is desirable to have contributions from different polymers and still retain their compatibility in order to avoid phase separation in lubrication or hydraulic systems.

Those skilled in the art, having been given the present disclosure, will readily be able to choose a great variety of solvents for preparing solutions of blended polymers, naturally recognizing that for a given blend of two or more interpolymers one solvent may be more suitable than another, or stated another way a given solvent may be excellent for a particular blend of interpolymers but entirely unsuited for a blend of different interpolymers especially where different monomers are employed in making such different interpolymers. In most instances, the polymer solutions will contain a maximum of 20 to 25 weight percent total polymer, and for many uses the amount of polymer may be quite small, such as a fraction of one percent. By way of example, of suitable solvent-polymer combinations, benzene is a good solvent for the polymer blends of Example 2, methyl ethyl ketone for those of Examples 4 and 5, toluene for those of Example 7, dioxane for those of Example 14.

As an aid in choosing suitable solvents for any particular polymer mixture, attention is directed to certain fundamentals known to polymer chemists, see particularly Small, Journal of Applied Chemistry, 1953, 3, 71–80. The solubility of a polymer in a non-polymeric liquid depends mainly on the heat of mixing. When no polar forces are concerned, the cohesive energy densities of polymer and solvent must be near the same value. For a pure liquid, the cohesive energy density is the quotient of the molar heat of vaporization and the molar volume, and is thus the amount of energy necessary to separate one cc. of liquid into its molecules, or conversely the energy which holds one cc. of liquid together. On the assumption that the forces which hold a fluid together are the same as those that hold a polymer together, a polymer will exhibit maximum swell or ability to dissolve in a fluid of the same cohesive energy density as the polymer. To obtain the cohesive energy density of a polymer, it is immersed in liquids having a wide range of cohesive energy densities. The observed swell, in terms of cc. of liquid absorbed per gram of actual polymer, is plotted against the square root of the cohesive energy density, also called solubility parameter, of the various solvents and the point of maximum swell was taken as the solubility parameter of the polymer. In the article by Small referred to above, tables are given in which the solubility parameters of a variety of polymers are listed, as well as those of a variety of liquids. Also given is a table of the molar attraction constants of atoms and various groupings of atoms from which the solubility parameters of other polymers can be estimated.

Considerations similar to those discussed above with reference to making solutions of polymers, apply with respect to plasticizing polymer blends. Generally an amount of a high boiling liquid plasticizer within the range of 1 to 50 parts by weight per 100 parts by weight polymers in the blend, or more often from 5 to 30 parts by weight plasticizer, will be used. Naturally, the amount will depend greatly on the particular interpolymers blended, the particular plasticizer, and the use to which the plasticized composition is to be put. Most plasticizers of course are high boiling so that they remain a more or less permanent part of the polymer composition, but low boiling liquids acting as temporary plasticizers and later volatilized are often included. As discussed by Houwink in "Elastomers and Plastomers," vol. I, Elsevier Publishing Company, Inc. (1950), page 457, plasticization takes place through formation of a gel which can be regarded as a solution of the liquid plasticizer in the polymer. The theory of plasticization is part of the general theory of polymer solutions, and although polymer solutions contain low concentrations of polymer, and plastic gel high concentrations, it is not possible to develop a theory for each class independently. In fact, much of the theory of plasticization and several of the evaluation methods used are based on the behavior of solutions containing low concentrations of polymer. When large molecules mix with small, there is a considerable entropy change which, in the absence of any specific interaction of the components, accounts for the formation of solutions or gels. Interaction between polymer and plasticizer is usually due to Van der Waals forces, but according to certain authors there may be something in the nature of a molecular compound formed. Solvent power is an important factor in plasticization, but solvent power is only relative and there is no sharp distinction between the solvent and non-solvent plasticizers. Plasticizers of low solvent power are sometimes termed gelatinizers or softeners.

Among the most important forms of plasticized polymers are the plastisols. A plastisol may be defined as a fluid dispersion of a polymer in a liquid plasticizer, often containing in addition stabilizers, colors and fillers. Plastisols may vary greatly in solids content and viscosity, but usually take the form of pastes of polymer in one or more plasticizers which are non-solvents for the polymer at room temperature. Plastisols are readily converted into finished products by subjecting them to an elevated temperature at which the polymer is solvated by the plasticizer forming an essentially homogeneous plasticized mass. Plastisols are used by dipping, molding and casting or coating, and thus all sorts of objects can be coated, fabrics can be coated, and self-sustaining objects of a variety of shapes can be obtained by molding and casting. While vinyl chloride resins are those most largely used at the present time in plastisols, the technique is available for any thermoplastic resin. Often two plasticizers at used, one being a poor solvent and the other a good solvent for the polymers, and they are mixed in proper proportions to obtain a plasticizing liquid with critical solvent power for the particular resin. The critical solvent power of a plasticizer is important first so that at room temperature, i.e., before use, the plastisol is stable and fluid enough to pour readily, and secondly so that at higher temperatures the plasticizer dissolves readily into the polymers. The particle size and porosity of the polymers are important to get proper mixing and to obtain a plastisol with a desired viscosity for handling. The compatible blends of interpolymers obtainable by the practice of the present invention are put to valuable use in the form of plastisols. Of special interest are plastisols obtained by using a mixture of compatible polymers, i.e., two or more of those whose compatibility is demonstrated in Example 1 above, with a partially crystalline polymer such as polyvinyl chloride (or vinyl chloride/vinyl acetate copolymer wherein the vinyl acetate is present in comparatively small amounts), the vinyl chloride polymer being limitedly compatible with the other polymers, plus a plasticizer such as dioctyl phthalate or a mixture of dioctyl phthalate and HB–40 (partially hydrogenated terphenyl).

While the invention has been described with particular reference to various preferred embodiments thereof, and examples have been given of suitable monomer combinations, proportions, and procedures, it will be appreciated that variations from the details given can be effected without departing from the invention.

I claim:

1. A composition of matter comprising a compatible blend of polymers A and B, said blend being capable of forming a clear homogeneous film on casting from solution; polymer A being a non-opaque terpolymer prepared by subjecting to batch free-radical polymerization conditions a monomeric mixture consisting of ethylenically unsaturated monomers $(a)$, $(b)$ and $(c)$, wherein $(a)$ is an ethylenically unsaturated monomer that forms a binary azeotropic copolymer with $(b)$ and that also forms a binary azetropic copolymer with $(c)$ and wherein $(b)$ and $(c)$ are ethylenically unsaturated monomers that do not form a binary azeotropic copolymer with each other and wherein the system $(a)/(b)/(c)$ is such that the line joining the $(a)/(b)$ and the $(a)/(c)$ binary polymerization azeotrope compositions as plotted on an equilateral triangular coordinate graph defines monomer composition all of which form clear terpolymers, the proportions of the three monomers in said monomeric mixture being limited to those in the area of mixtures that produce non-opaque terpolymers, said area encompassing the aforesaid line; polymer B being an interpolymer selected from the group consisting of (I) a terpolymer of said (a), said (b) and said (c) satisfying all of the requirements set forth above for polymer A but the proportions of the three monomers in the monomeric mixture being different from those of polymer A, (II) a binary azeotropic copolymer of said (a) and said (b), and (III) a binary azeotropic copolymer of said (a) and said (c); (a), (b) and (c) in polymer B being respectively identical with (a), (b) and (c) in polymer A; said triangular graph depicting the percentage composition of monomers (a), (b) and (c) in mixtures thereof and the three apexes of said graph respectively designating 100 percent of the respective three monomers.

2. A composition of matter according to claim 1 including an organic liquid solvent for said blend of polymers A and B.

3. A composition of matter according to claim 2 which is normally liquid.

4. A composition of matter comprising a compatible blend of polymers A and B, said blend being capable of forming a clear homogeneous film on casting from solution; polymer A being a non-opaque terpolymer prepared by subjecting to batch free-radical polymerization conditions a monomeric mixture consisting of ethylenically unsaturated monomers (a), (b) and (c), wherein (a) is an ethylenically unsaturated monomer that forms a binary azeotropic copolymer with (b) and that also forms a binary azeotropic copolymer with (c) and wherein (b) and (c) are ethylenically unsaturated monomers that do not form a binary azeotropic copolymer with each other and wherein the system $(a)/(b)/(c)$ is such that the line joining the $(a)/(b)$ and the $(a)/(c)$ binary polymerization azeotrope compositions as plotted on an equilateral triangular coordinate graph defines monomer compositions all of which form clear terpolymers, the proportions of the three monomers in said monomeric mixture being limited to those in the area of mixtures that produce non-opaque terpolymers, said area encompassing the aforesaid line; polymer B being a terpolymer of said (a), said (b) and said (c) satisfying all of the requirements set forth above for polymer A but the proportions of the three monomers in the monomeric mixture being different from those of polymer A; (a), (b) and (c) in polymer B being respectively identical with (a), (b) and (c) in polymer A; said triangular graph depicting the percentage composition of monomers (a), (b) and (c) in mixtures thereof and the three apexes of said graph respectively designating 100 percent of the respective three monomers.

5. A composition of matter comprising a compatible blend of polymers A and B, said blend being capable of forming a clear homogeneous film on casting from solution; polymer A being a non-opaque terpolymer prepared by subjecting to batch free-radical polymerization conditions a monomeric mixture consisting of (a) acrylonitrile (b) a monomer selected from the group consisting of α-acetoxystyrene, α-methylstyrene, styrene, vinyltoluene, vinylxylene, and (c) a different monomer selected from said group, the proportions of the three monomers in said monomeric mixture being limited to those in the area of mixtures that produce non-opaque terpolymers, said area encompassing the line joining the binary polymerization azeotrope composition of acrylonitrile and the particular (b) on the one hand and acrylonitrile and the particular (c) on the other hand as plotted on an equilateral triangular coordinate graph; polymer B being an interpolymer selected from the group consisting of (I) a terpolymer satisfying all of the requirements set forth above for polymer A but the proportions of the three monomers in the monomeric mixture being different from those of polymer A, (II) a binary azeotropic copolymer of acrylonitrile and said (b) monomer, and (III) a binary azeotropic copolymer of acrylonitrile and said (c) monomer; (b) and (c) in polymer B being respectively identical with (b) and (c) in polymer A; said triangular graph depicting the percentage composition of monomers (a), (b) and (c) in mixtures thereof and the three apexes of said graph respectively designating 100 percent of the respective three monomers.

6. A composition of matter according to claim 5 wherein the monomeric mixtures from which both A and B are prepared have compositions on the said line joining the said binary polymerization azeotrope compositions.

7. A clear single-phase homogeneous solution of polymers A and B in an organic liquid solvent therefor, polymers A and B being as defined in claim 5.

8. A clear homogeneous film formed of a compatible blend of: A, a non-opaque terpolymer prepared by subjecting to batch free-radical polymerization conditions a monomeric mixture consisting of acrylonitrile, styrene and α-methylstyrene wherein the proportions of same in said monomeric mixture are limited to those in the area of mixtures that produce non-opaque terpolymers, said area encompassing the line joining the binary polymerization azeotrope composition of acrylonitrile and styrene on the one hand and acrylonitrile and α-methylstyrene on the other hand as plotted on an equilateral triangular coordinate graph, and B, an interpolymer prepared by free-radical-initiated batch polymerization of a monomeric mixture consisting of acrylonitrile and at least one of the group consisting of styrene and α-methylstyrene wherein the proportions of same in said monomeric mixture are on said line but are different from those of polymer A; said triangular graph depicting the percentage of monomers acrylonitrile, styrene and α-methylstyrene in mixtures thereof and the three apexes of said graph respectively designating 100 percent of acrylonitrile, styrene and α-methylstyrene.

9. A clear single-phase homogeneous liquid solution of about 5 parts by weight of polymer A, about 5 parts by weight of polymer B, and about 90 parts by weight of a lower aliphatic ketone, polymers A and B being as defined in claim 8.

10. A clear homogeneous compatible blend of polymers A and B; polymer A being prepared by subjecting to batch free-radical mass polymerization conditions a monomeric mixture consisting of acrylonitrile, styrene and α-methylstyrene in the approximate respective proportions of 30/55/15 by weight; polymer B being a binary azeotropic copolymer of acrylonitrile and a member of the group consisting of styrene and α-methylstyrene.

References Cited in the file of this patent

UNITED STATES PATENTS

| | | |
|---|---|---|
| 2,299,433 | Stoner | Oct. 20, 1942 |
| 2,329,456 | Campbell | Sept. 14, 1943 |
| 2,414,803 | D'Alelio | Jan. 28, 1947 |
| 2,461,613 | Quarles et al. | Feb. 15, 1949 |
| 2,512,726 | Penn | June 27, 1950 |
| 2,530,738 | Spessard | Nov. 21, 1950 |

FOREIGN PATENTS

| | | |
|---|---|---|
| 762,157 | Great Britain | Nov. 21, 1956 |

UNITED STATES PATENT OFFICE
CERTIFICATE OF CORRECTION

Patent No. 3,009,895                                  November 21, 1961

Robert J. Slocombe

It is hereby certified that error appears in the above numbered patent requiring correction and that the said Letters Patent should read as corrected below.

Column 11, line 47, for "betwen" read -- between --; column 18, line 65, after "polymer 9" insert a closing parenthesis; column 20, in the table, column 2, line 13 thereof, for "monoaklyl" read -- monoalkyl --; same table, column 1, line 3 thereo: for "3-4" read -- 3-3 --; same table, column 2, line 15 thereof, for "diethyl fumarate" read -- methyl vinyl ketone --; column 21 in the table, column 2, line 31 thereof, for "A-Methylstyrene" read -- α-Methylstyrene --; column 24, line 25, for "at" read -- are --; line 44, for "amounts)." read -- amounts), --.

Signed and sealed this 31st day of July 1962.

(SEAL)
Attest:

ERNEST W. SWIDER
Attesting Officer

DAVID L. LADD
Commissioner of Patents